(12) United States Patent
Buckris et al.

(10) Patent No.: US 11,354,743 B1
(45) Date of Patent: Jun. 7, 2022

(54) SYSTEM AND METHODS FOR QUANTITATIVE DATA SECURITIZATION VIA A VALUE EXPOSURE, PORTIONING, AND EXCHANGE PLATFORM

(71) Applicant: Eco Media NYC, Broooklyn, NY (US)

(72) Inventors: Ruben Buckris, Brooklyn, NY (US); Linda Buckris, Brooklyn, NY (US)

( * ) Notice: Subject to any disclaimer, the term of this patent is extended or adjusted under 35 U.S.C. 154(b) by 0 days.

(21) Appl. No.: 17/341,979

(22) Filed: Jun. 8, 2021

(51) Int. Cl.
*G06Q 40/04* (2012.01)
*G06Q 40/02* (2012.01)

(52) U.S. Cl.
CPC .............. *G06Q 40/04* (2013.01); *G06Q 40/02* (2013.01)

(58) Field of Classification Search
CPC ........ G06Q 40/04; G06Q 40/06; G06Q 40/00; G06Q 30/08; G06Q 40/02
See application file for complete search history.

(56) References Cited

U.S. PATENT DOCUMENTS

| 8,458,065 B1* | 6/2013 | Zhang | G06Q 10/0639 705/35 |
| 2003/0195822 A1* | 10/2003 | Tatge | G06Q 30/0635 705/37 |
| 2021/0392003 A1* | 12/2021 | Law | H04L 9/3231 |

OTHER PUBLICATIONS

Samo, Yves-Laurent Kom., Dr. Dieter Hendricks. "What Makes an Asset Useful?" Pit. AI Research Paper Series. Pit. AI Technologies Inc., Jun. 25, 2018. (Year: 2018).*

"Introducing Parcel Beta" Oasis Labs, www.oasislabs.com/blog/parcel-beta, Apr. 20, 2021 (Year: 2021).*

* cited by examiner

*Primary Examiner* — Elda G Milef

(57) ABSTRACT

A securitization, exposure, portioning, and exchange platform for enabling the securitization or fixing of quantitative values of data parcels, which correspond to external assets, and the exchange of data parcels between account systems operating via computers over a network. The security of data parcels, which corresponds to their quantitative integrity, is controlled by removing their exposure to changes in their corresponding external assets.

20 Claims, 16 Drawing Sheets

US 11,354,743 B1

SYSTEM AND METHODS FOR QUANTITATIVE DATA SECURITIZATION VIA A VALUE EXPOSURE, PORTIONING, AND EXCHANGE PLATFORM

BACKGROUND

When the quantitative values of a data set are determined by informational events external to the data set or even external to the system in which the data set is created and used, the data set may experience a loss in its quantitative integrity. However, this issue is compounded by two factors: first, it is often necessary to send a data set from one computer to another computer, one account to another account, one network to another network, or one system to another system, and therefore the data sets cannot be entirely static. Often, data sets are exchanged and not always in their entirety, and in order to prevent a loss in total numerical value for multiple exchanged data sets, there must be a way to portion each data set in a reciprocal manner. Second, quantitative integrity is in one sense the maintenance of the precise numerical value of the data set, but in another sense it is merely the prevention of a decrease of the numerical value. Since informational events external to the data set may possibly increase the numerical value of the data set, a degree of exposure thereto may be desired. What is needed are algorithms that allow for balanced exchange of the data sets as well as control over the exposure of the data sets to informational events in order to not merely maintain the numerical value but also allow for their increase.

SUMMARY

This application describes a securitization, exposure, portioning, and exchange platform for enabling the securitization or fixing of quantitative values of data groups (i.e., a set of data assembled into a group based on sharing an underlying referrant, with one example of a data group being a data parcel, as will be defined), and the internal exchange of data parcels between account systems operating via computers over a network. The securitization of the quantitative values is achieved through a removal of the data parcels from exposure to data events external to the platform and is obtained via decoupling the data parcels from their external referrants. Data events may include a sudden increase or decrease in the external exchange value of assets to which a data parcel refers, and thus securitization protects the internal exchange value of data parcels which would otherwise be affected by the volatility of an external exchange value. Portioning of the data parcels allows for control over the degree of securitization and decoupling.

Internal exchange of the data parcels provides for maintaining the efficacy and value of the data parcels even after securitization and decoupling. The internal exchange of data parcels across account systems may be coordinated through the calculation and use of circulation data, which on the platform exists in a plurality of types. Since the circulation data coordinates the internal exchange of data parcels, the plurality of circulation data types enables the diversification of the means by which the data parcels are exchanged across account systems. Since different account systems are supported by different external accounts, and circulation data is at least partially parameterized by the data found in those external accounts, the plurality of circulation types prevents an exchange prioritization of account systems that are coupled to one set of external accounts over account systems coupled to other sets of external accounts.

The data parcels and circulation data are not merely aggregates of data but are coupled to (or intentionally decoupled from) various real-world or external assets which have real-world or external value, and are created by accessing the accounts, external to the platform, which control the real-world assets. However, the relationship between the data parcels and circulation data and the external assets is managed through an interaction of platform parameters controlled at least in part by users of the platform via their designated account systems, which are micro-networks consisting of their external accounts in communication with control over data parcels and circulation data within the platform. When the relationship between the data parcels or the circulation data and the external assets is severed (i.e., decoupled), originals of the data parcels and circulation data become controlled by the platform and modified parallels data groups replace the originals in terms of account system control (i.e., following decoupling, the account system no longer controls the original but instead controls the modified parallel).

The platform provides for the exchange of control over originals and/or parallels between the various account systems of the platform and the platform itself. Since originals maintain their parameterized relationship with external assets, control over an original provides control over the external asset because the platform, by accessing the external accounts which partially form the account systems and communicating instructions thereto, effects changes in external asset ownership. Even though the parallel no longer maintains the strict parameterized relationship with external assets, it may continue to refer to the external asset and may obtain a partially parameterized relationship with the external asset.

BRIEF DESCRIPTION OF THE DRAWINGS

FIG. 3d is a flowchart showing an exemplary data parcel securitization method.

DETAILED DESCRIPTION

Figure 1:
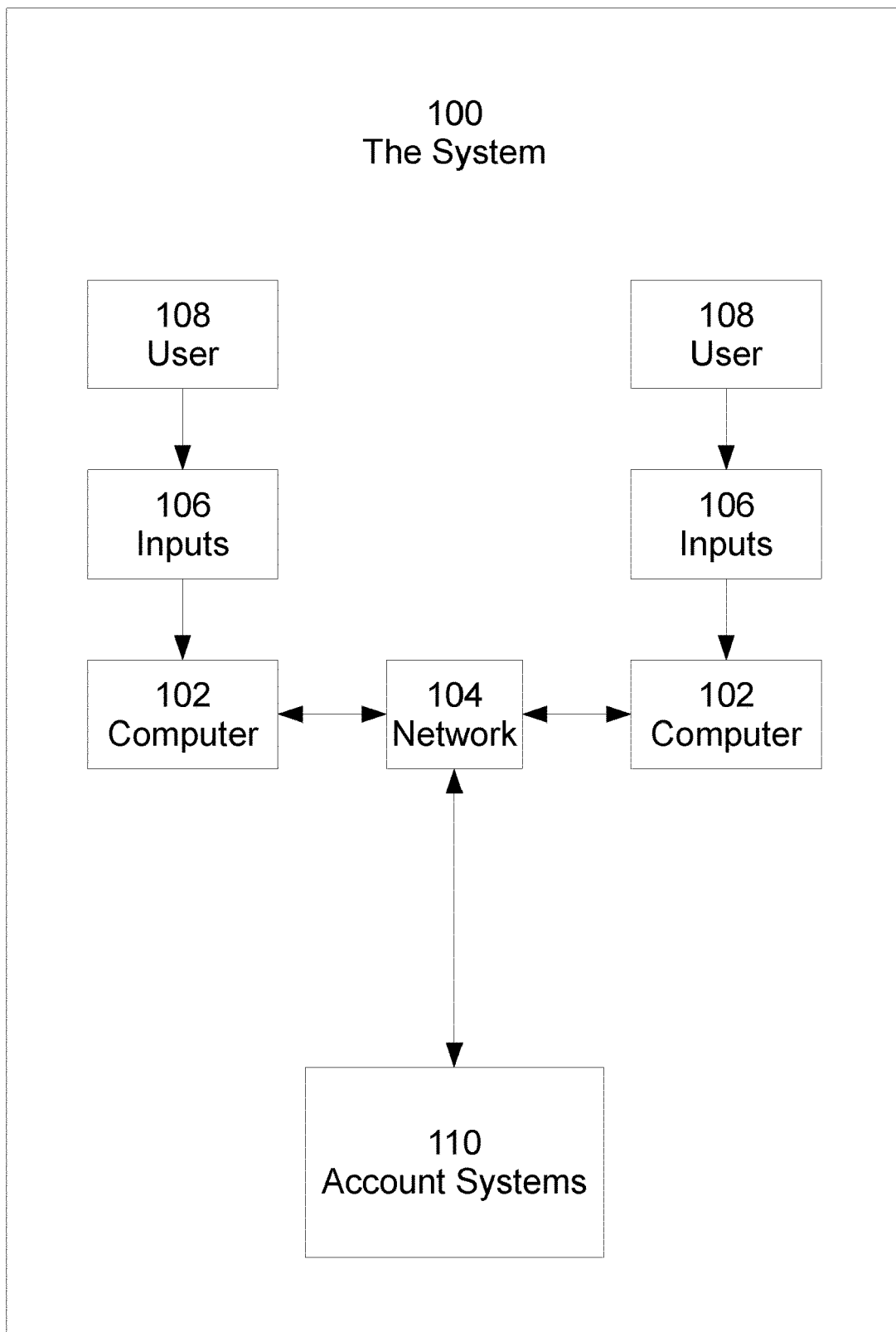
FIG. 1 shows an exemplary system architecture.

As shown in FIG. 1, the system 100 comprises a set of computers 102 connected over a network 104. "The system" may refer hereon to the system as a whole or a part thereof. The system may provide a platform accessible to users for requesting one or more actions to be taken by the system or for viewing data handled by the system. The system may, through the computers and via the network, perform one or more methods in response to requests by the users or in accordance with internal system requirements and logic.

A set of computers may refer to one or more conventional computers such as desktop or laptop computers, a smart device such as a smart phone, smart watch or tablet, a dedicated device which is designed exclusively for the platform described herein, or a combination of conventional computers, smart devices, and dedicated devices. Each of these computers may comprise a set of inputs 106 to be manipulated or defined by users 108, a set of processors, processing memory, storage drives, and/or display screens. Inputs may include mouse and keyboard, touchpad, microphone, card reader, RFID or NFC tag reader, etc. A set of computers may refer hereon to a plurality of such computers or a single computer thereof.

The network may be a private network only accessible by providing satisfactory login credentials and/or a public network, such as the internet. A set of account systems 110 may be stored across and accessible by the set of computers operating over the network. An account system is an account which is able to assertively engage with (i.e., receive and transmit information, including instructions) one or more external accounts, permissively engage with other account systems (i.e., request to receive and exchange information and/or data parcels an circulation data) and is configured to be assigned control over data parcels and circulation data sets. External accounts are accounts which are primarily accessed outside the present platform via other platforms.

Figure 2:
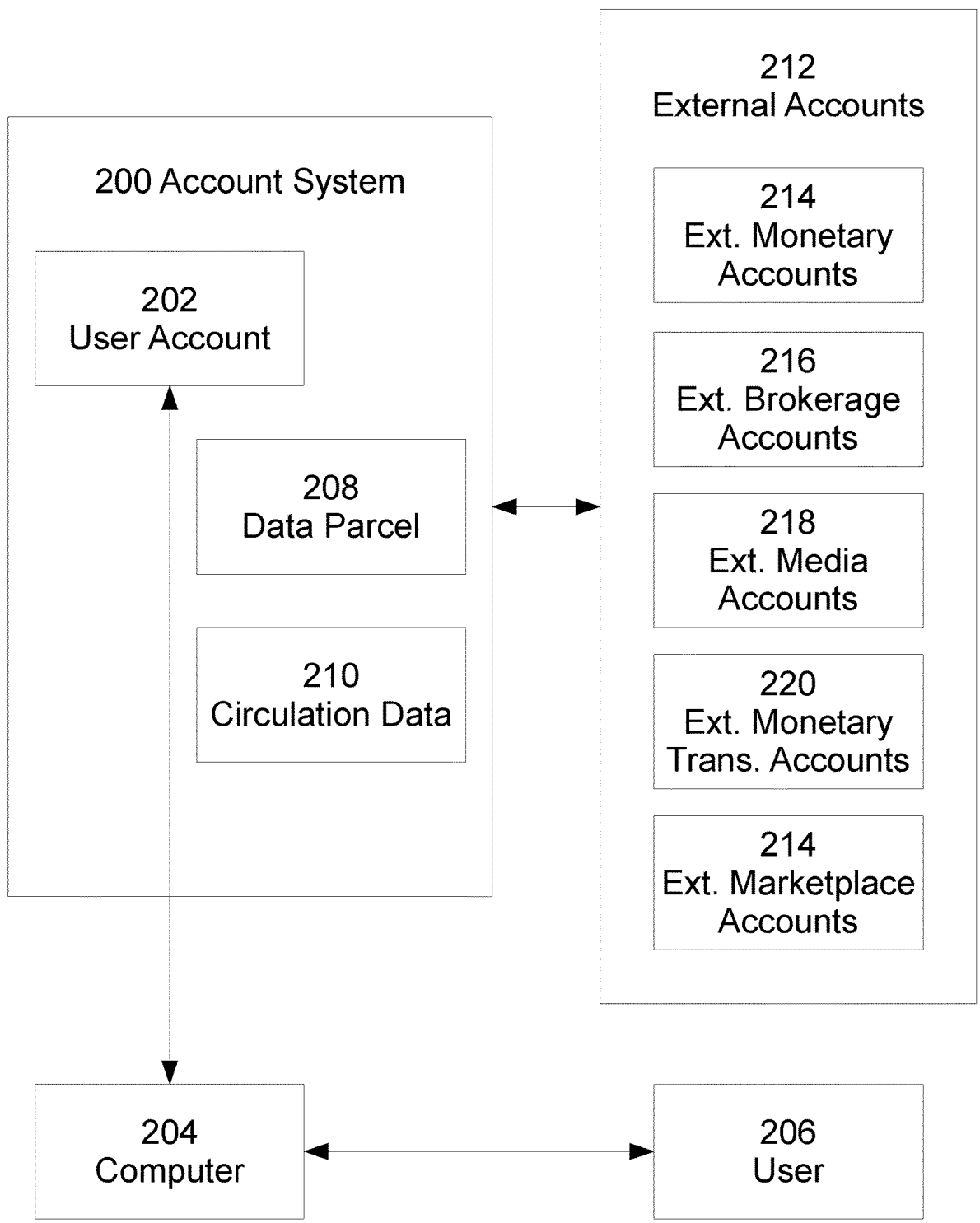
FIG. 2 shows an exemplary account system architecture.

As shown in FIG. 2, an account system 200 may refer to one or more user accounts 202 accessible via the set of computers 204. Each account system is generally owned or otherwise accessed by a particular user 206, with the user being able to access the account system via the set of computers, such as via a laptop, a smart phone, and a dedicated device. The system may have any number of account systems, such as ten, one hundred, one thousand, or more, depending on the number of users. Each account system revolves around access to and manipulation of various data parcels 208 and circulation data sets 210, as will be defined. In addition to using the set of computers, the user may be required to enter satisfactory login credentials, such as a username and password, or biometric data, such as a fingerprint or voice signature. An account system may be integrated with or coupled to one or more external accounts 212, such as external monetary accounts 214 which handle users' monetary information, receive and store incoming funds and permit the transfer of those funds upon receiving authorization from the users, external brokerage accounts 216 which hold, purchase, and sell financial assets such as securities on behalf of the users, external media accounts 218, which display media such as posts or videos posted by users and which generally permit users to communicate with each other, external monetary transfer accounts 220, which are typically coupled to external monetary accounts and permit users to transfer and receive funds from and to their external monetary accounts, and external marketplace accounts 222, which permit users to buy and sell various non-financial assets. External monetary accounts may include bank accounts, external brokerage accounts may include brokerage and investment accounts, external media accounts may include social media accounts, and external transfer accounts may include payment platforms.

The coupling of an account system to an external account may be achieved upon receiving from a user the login credentials for the external account via an interface within the system platform and receiving permission to keep such credentials saved with the account system. The login credentials may then be entered by the system via an API. The system itself may also have its own account system—i.e., an administrative account system. This administrative account system may be referred to as a "system account system" (from hereon, SAS) and is not owned or accessed by any particular user but can nonetheless interact with other account systems the way other account systems can interact with each other, as will be described.

A data parcel is a collection of data that may be conveyed from one set of computers to another set of computers but is generally controlled by a single account system. The data parcel may have a title parameter, which identifies the current account system for which permission is given to make decisions regarding the data parcel. Generally, the title parameter for a given data parcel identifies only a single account system, and no other account system may make decisions respecting that given data parcel, although another account system may request the identified account system to make a particular decision, usually in the context of changing title parameters which determine control, as will be described. The data parcel may have a reference identity parameter, with the reference identity indicating an asset such as a physical object, such as a particular make and model of a car, or a non-physical object, such as a particular corporate stock. The reference identity parameter may indicate both an instance of an asset as well as the asset class—for example, an asset may be instantiated as a particular make and model of a car and classified as a vehicle and/or physical asset, with both the instantiation and classification included in the reference identity parameter.

The data parcel may have a reference quantity, with the reference quantity indicating the quantity of the asset indicated by the reference identity parameter—for example, the reference quantity could correspond to the number of referenced cars or stocks. The data parcel may have a reference value parameter, with the reference value indicating an external exchange value of the asset. For example, a particular stock may have an external exchange value of $300 if it can be purchased outside the system for $300. Thus, the external exchange value may be detected by the system but is not controlled by the system. The reference identity, reference quantity, and reference value parameters may be set by an administrator of the system or received by the system from a separate system, network, database, organization, or institution.

The data parcel may have an internal exchange value parameter, which identifies the exchange value of the data parcel within the system, with exchange being a process of changing the title parameters between two data parcels or circulation data sets (which will be discussed below). The internal exchange value is initially set as the reference value parameter, but the internal exchange value parameter may diverge from the reference value parameter, as will be discussed. The internal exchange value is generally processed by the system in relation to circulation data, such that circulation data serves as the measurement unit for the internal exchange value parameter. The internal exchange value parameter is anchored to a reference quantity of 1, and therefore a total internal exchange value would be calculated by the system as the internal exchange value parameter times the reference quantity parameter.

A data parcel may have a security parameter, which is a binary parameter indicating whether the internal exchange value parameter is fixed to the reference value parameter. The security parameter is set by the account system in order to secure the existing value of the data parcel. More precisely, securing a data parcel will freeze its current internal exchange value. Thus, if the security parameter is FALSE, then the internal exchange value equals the reference value parameter, but if the security parameter is TRUE, then the internal exchange value is permanently fixed by the system at its current value, and consequently is permitted to diverge from the reference value if the reference value, which follows the external exchange value, increases or decreases from its initial value. Here, TRUE corresponds to —secured— and FALSE corresponds to —unsecured—, but these terms are just merely conventional and could be represented by -0- and -1- or any other binary construction.

In one variation, upon receiving a request to change the security parameter of a data parcel from FALSE to TRUE, the system creates a data parcel parallel, which is a modified copy of the original data parcel. The data parcel original and data parcel parallel are the same, except the title parameter of the data parcel original is changed to SYSTEM while the data parcel parallel is set as the originally identified account system. The security parameter of the data parcel original is set to FALSE while the data parcel parallel is changed to TRUE. Thus, SAS gains control over the data parcel original and the account system which requested the change is assigned the newly created data parcel parallel. Aside from their origin, data parcel parallels are treated by the system as regular data parcels and will be not hereon be distinguished from regular data parcels. In one variation, as will be described, since control over the data parcel original is changed from the account system to SAS, instructions will be transmitted to the external account system controlling the asset referenced by the data parcel original to sell or transmit the asset to an external account coupled to SAS.

In one variation, if the account system assigned the data parcel parallel requests the security parameter to be changed from TRUE to FALSE, no additional data parcel parallel is created, and nor is the data parcel original assigned back to the requesting account system. Instead, changes in the internal exchange value of the data parcel original, upon being detected, are quantified as percentile changes (i.e., +/−x %), and then internal exchange value of the data parcel parallel is changed according to the same percentile change. Thus, if the internal exchange value of a data parcel original changes from 100 to 150, and if the security parameter of the data parcel parallel is 200, then the internal exchange value of the data parcel parallel will be changed from 200 to 300. Thus, the data parcel parallel is desecuritized and exposed to the volatility of the external exchange value of the asset referenced by the reference identity parameter.

Figure 3A:
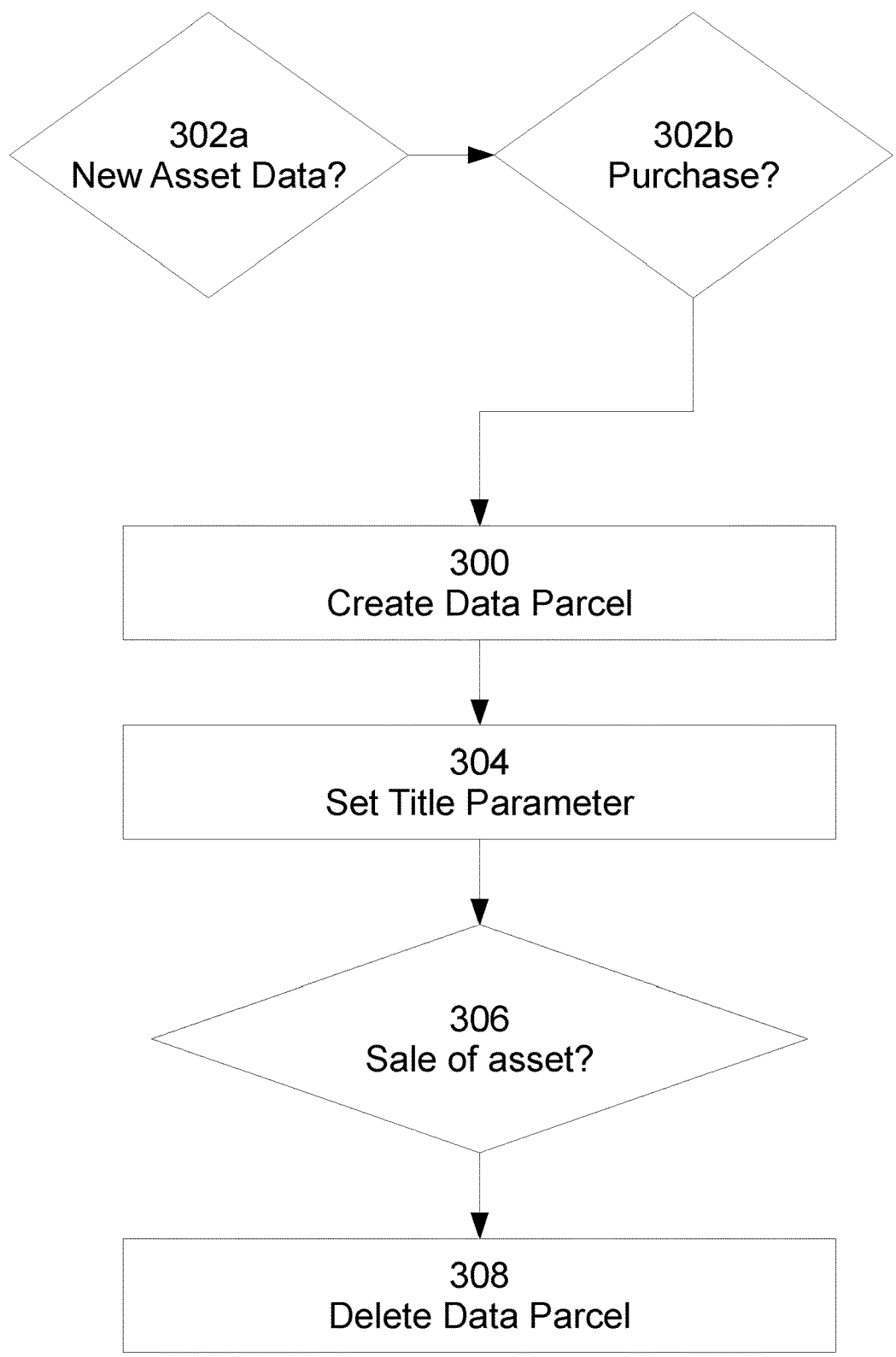
FIG. 3a is a flowchart showing an exemplary data parcel creation and deletion method.

As shown in FIG. 3a, a data parcel may be created 300 upon receiving new asset data from an external account 302a. The new asset data may comprise data pertaining to a purchase made via an external account 302b, such as the purchase of securities by an external brokerage account or of an automobile or a house in an external marketplace account. The title parameter may be set automatically 304 based on the account system coupled to the external accounts from which the new asset data is received. If the system receives new asset data from an external account pertaining to the sale of an asset indicated by the reference identity 306, then the data parcel may be deleted 308.

Figure 3B:
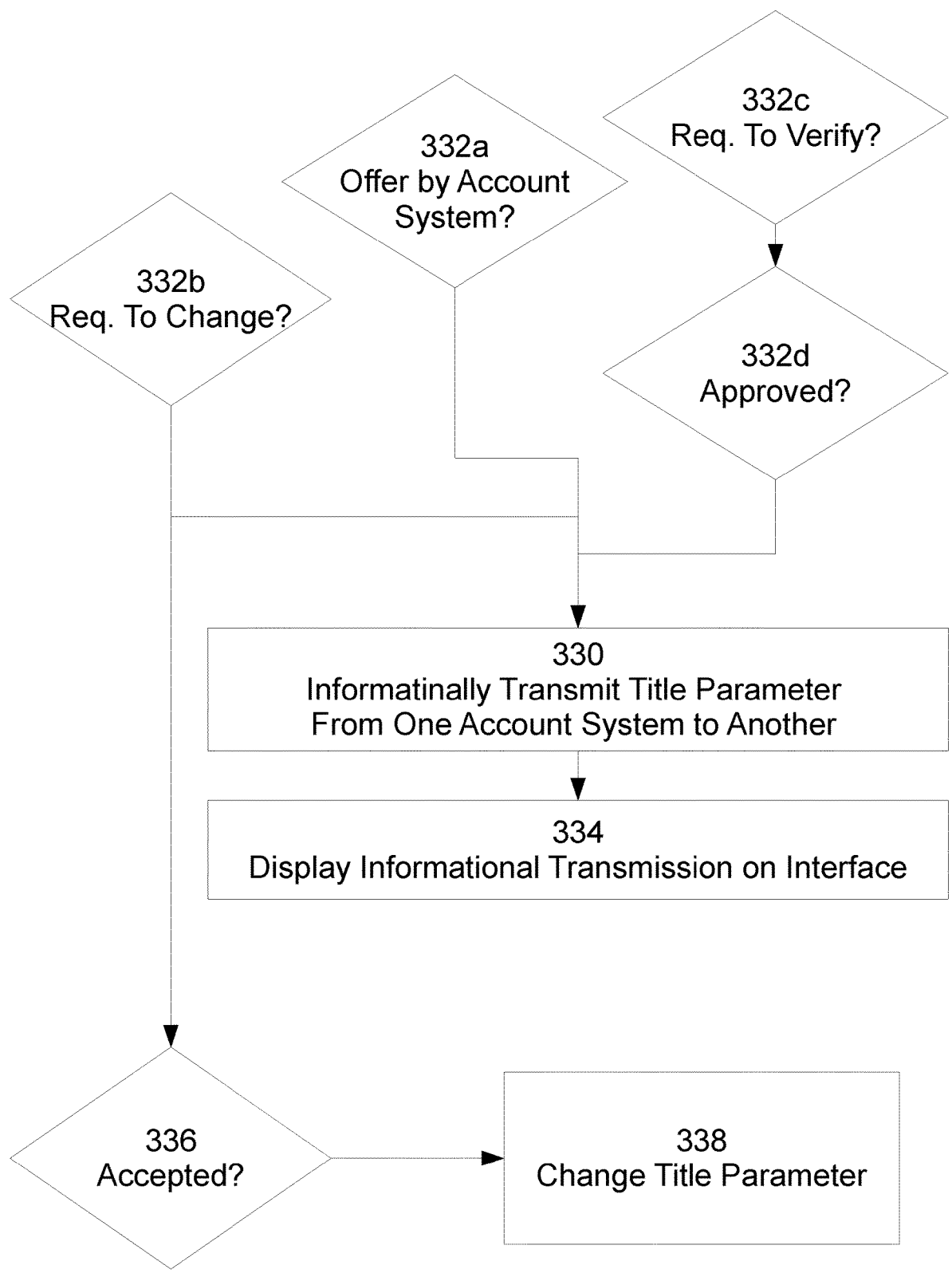
FIG. 3b is a flowchart showing an exemplary data parcel title transmission and change method.

As shown in FIG. 3b, the title parameter of a data parcel may be informationally transmitted 330 from one account system (the account system identified by the title parameter, i.e., the identified account system) to another account system if an offer to change the title parameter (and thus, control) from the identified account system to the other account system is made by the identified account system to the other account system 332a, or if a request to obtain control is sent by the other account system to the identified account system 332b, or if a request to merely verify the title parameter (and thus verify control) is requested 332c. A request to verify the title parameter may require approval from the identified account system 332d before informational transmission of the title parameter occurs. The informational transmission may be thereafter displayed on an interface for a user of the other account system to see 334. If the offer or request for change are accepted 336, then the title parameter is in fact changed from the identified account system to the other account system (the newly identified account system) 338.

Figure 3C:
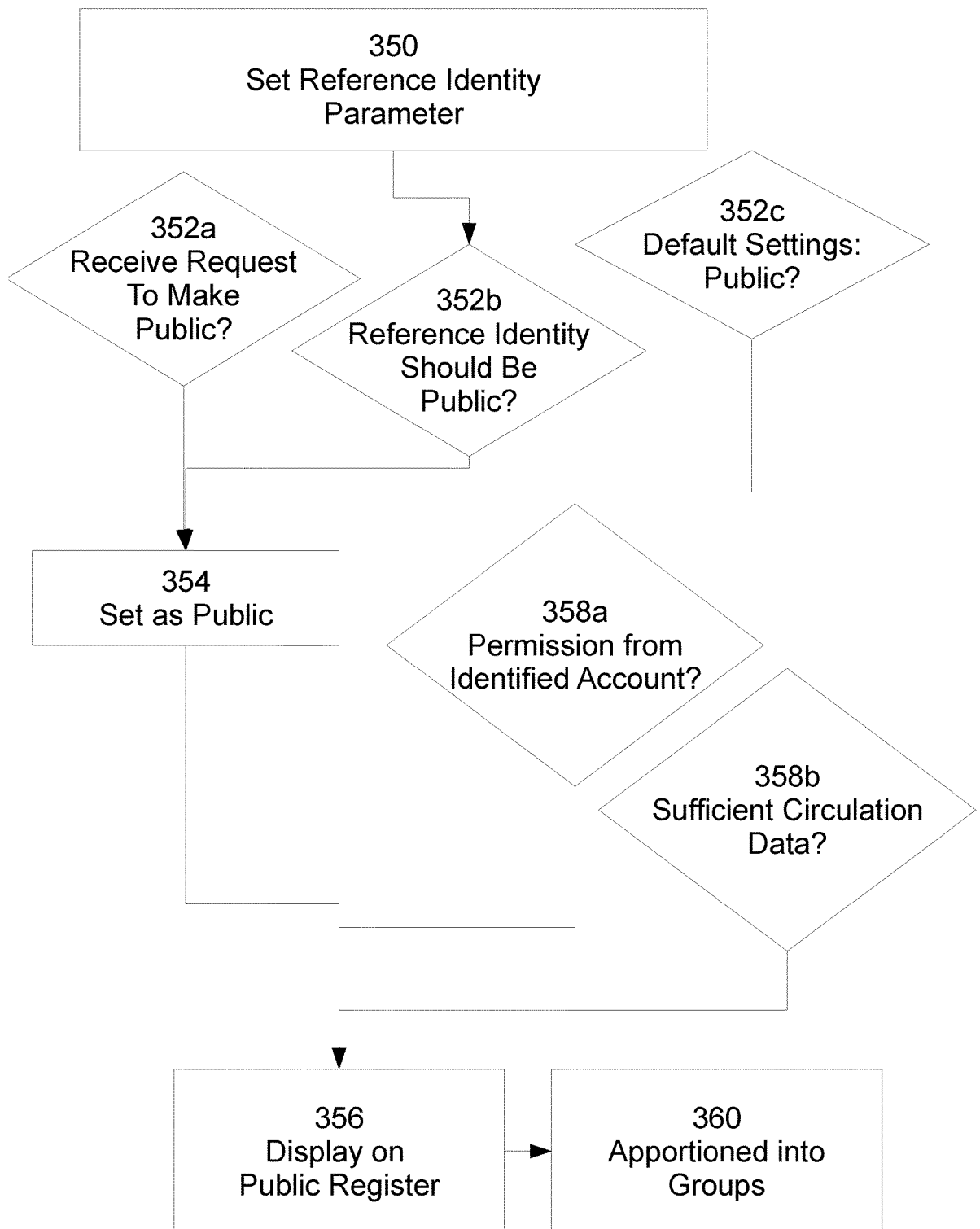
FIG. 3c is a flowchart showing an exemplary data parcel display method.

As shown in FIG. 3c, the reference identity parameter may be initially set 350 by the system based on the new asset data discussed earlier. The system may receive a request from the identified account system to make the data parcel public or private 352a or may automatically set the data parcel as private or public based on the reference identity parameter 352b and/or default settings for the class of reference identity set in the identified account system 352c. The public/private setting may be saved as a visibility parameter associated with the data parcel. If a data parcel is set as public 354, it may be displayed along with other parameters of the data parcel in a public register 356b. These other parameters may include the title parameter, the reference identity parameter, the reference quantity, the reference value parameter, the internal exchange value parameter, and/or the security parameter. The public register may be displayed on an account system interface. A given data parcel set as public may be displayed on the account system interface 356a if the accessing account system has permission from the identified account system 358a or if the viewing account system has circulation data with a quantity parameter and/or internal exchange value deemed sufficient by the system such that the identified account system might receive authorization to change the title parameter from the identified account system to the accessing account system 358b. The display of the public register may be apportioned into separate interface tabs, columns, or other organizational display divisions 360, with apportionments applied in order to group identified account systems, reference identities, reference identity classes, etc.

Figure 3D:
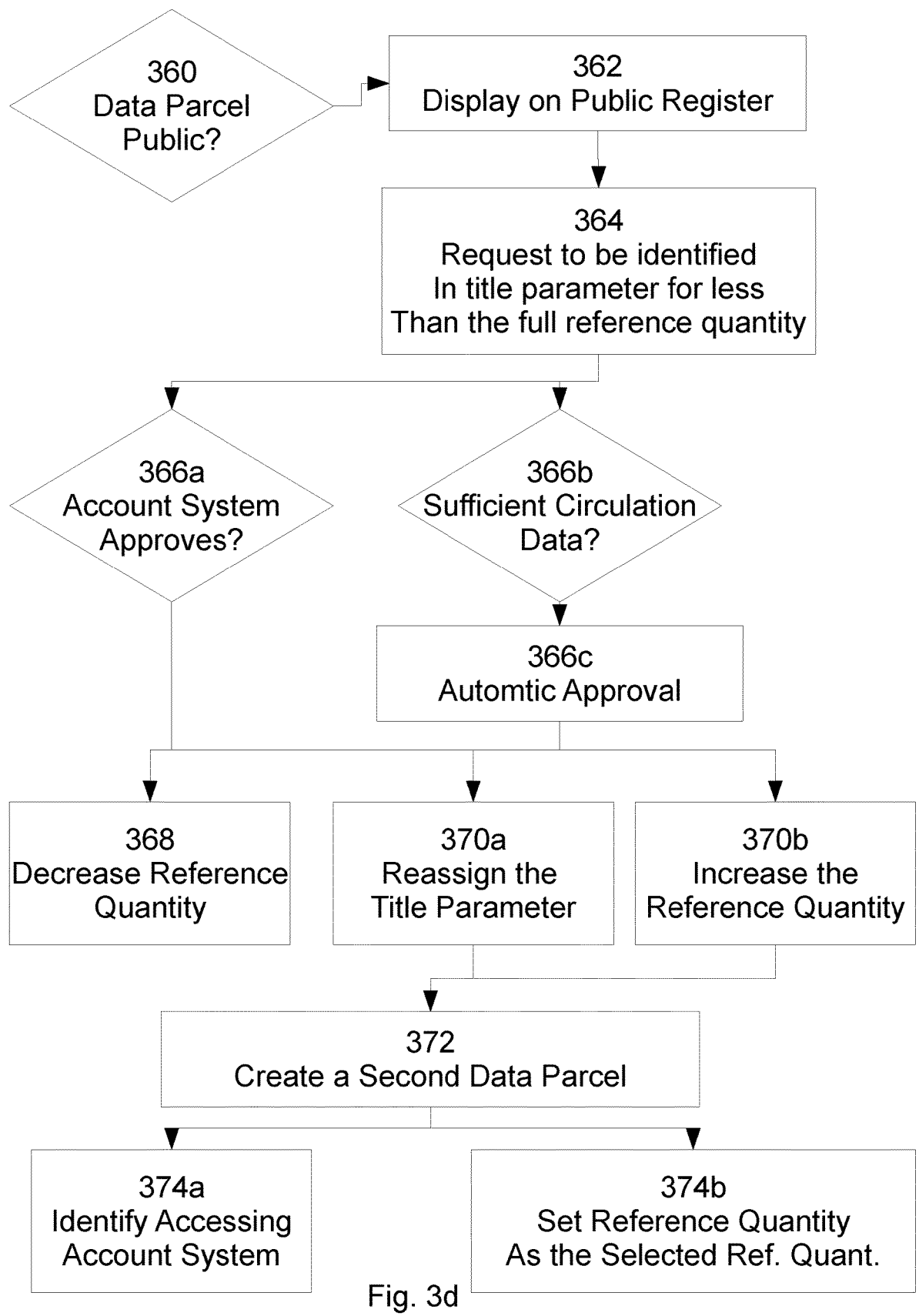
FIG. 3d is a flowchart showing an exemplary partial data parcel exchange and creation method.

As shown in FIG. 3d, a first data parcel may have its reference quantity changed while simultaneously a second data parcel may be created. If a first data parcel is set to public 360 it will be displayed on a public register 362. An accessing account system may request to be identified in the data parcel title parameter for less than the full reference quantity (a selected reference quantity) 364. The currently identified account system may approve 366a or the system may automatically approve 366c based on a calculation involving the sufficiency of the circulation data with a title parameter identifying the accessing account system 366b. The system will then decrease the reference quantity by the selected reference quantity 368, reassign the title parameter of the circulation data to the identified account system 370*a* or increase the reference quantity of the circulation data which already identifies the identified account system and decreases the reference quantity of the circulation data which identifies the accessing account system 370*b*, and create a second data parcel matching the parameters of the first data parcel 372, except for the title parameter, which will identify the accessing account system 374*a*, and the reference quantity, which will be set as the selected reference quantity 374*b*.

Figure 3E:
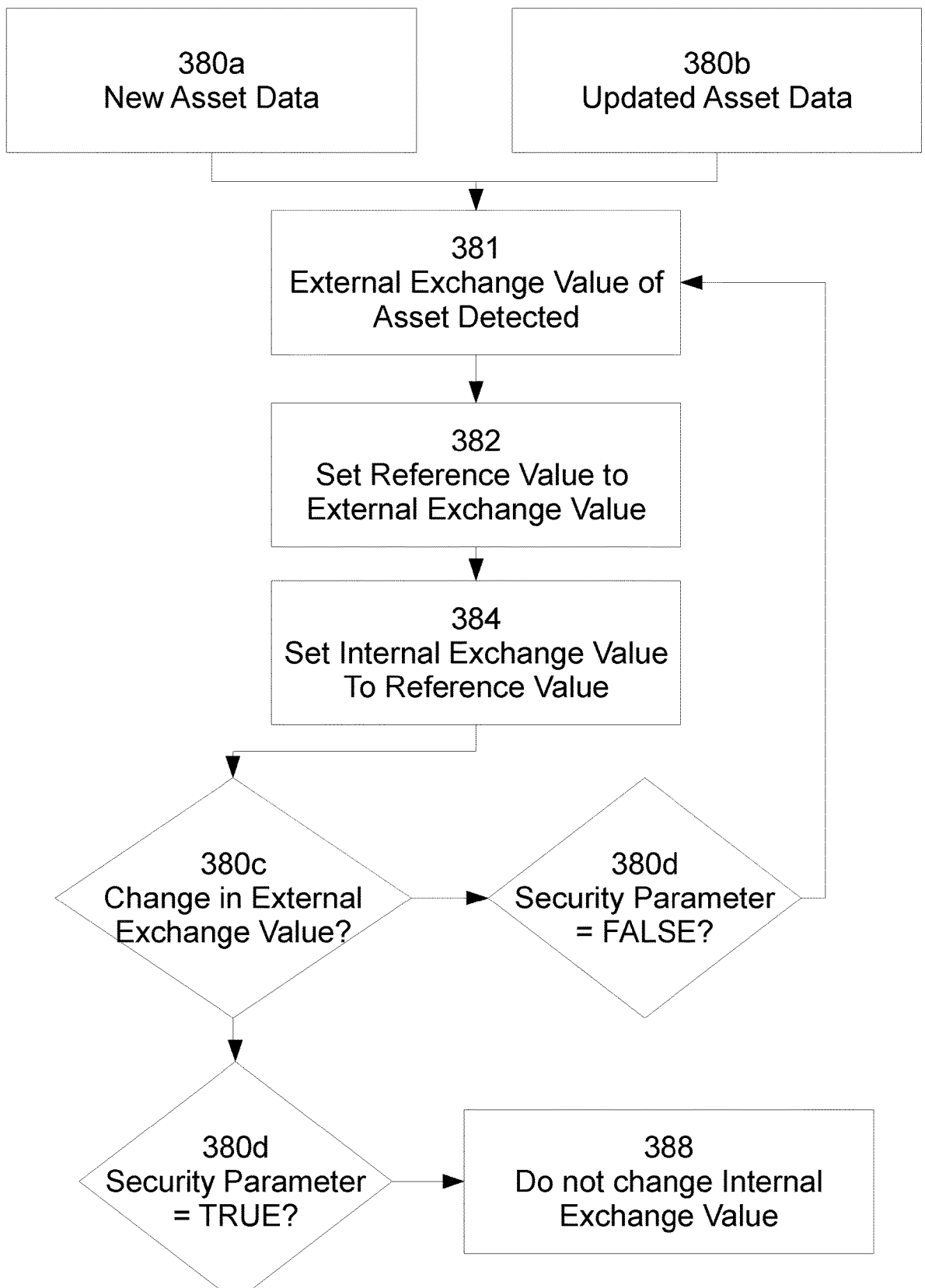
FIG. 3e is a flowchart showing an exemplary data parcel securitization method in which control over a first data parcel is given to SAS and a second data parcel is created for the account system.

As shown in FIG. 3*e*, the external exchange value of the asset referenced by the referenced identity of a data parcel may be initially detected 381 by the system based on the new asset data 380*a* or based on updated asset data 380*b*, with the updated asset data also obtained from an external account and pertaining to assets identified by the reference identity parameter. The reference value parameter may be initially set to the external exchange value 382 and the internal exchange value parameter may be set to the reference value parameter 384. If a change is the external exchange value is detected by the system based on updated asset data 380*c* and the security parameter is set to FALSE 380*d*, then the reference value is set to the new external exchange value and the internal exchange value is set to the reference value. However, if the security parameter is changed from FALSE to TRUE 380*e*, then even if a change in the external exchange value is detected by the system 380*c* and the reference value parameter changes, the internal exchange value will not change 388.

Figure 3F:
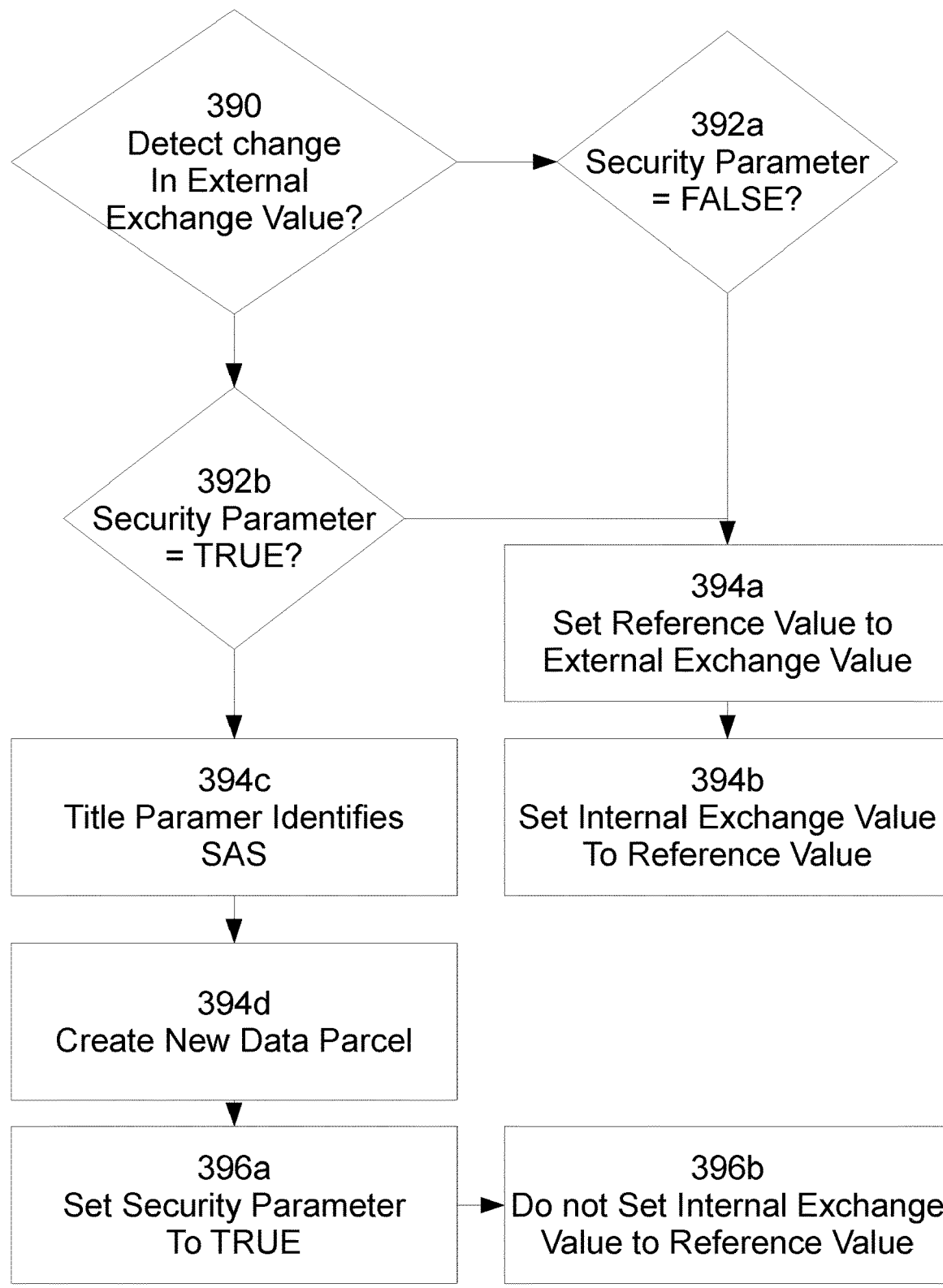
FIG. 3f is a flowchart showing an exemplary data parcel securitization.

In one variation, as shown in FIG. 3*f*, if a change is the external exchange value of a data parcel is detected by the system based on updated asset data 390 and the security parameter is set to FALSE 392*a*, then the reference value is set to the new external exchange value 394*a* and the internal exchange value is set to the reference value 394*b*. However, if the security parameter is changed from FALSE to TRUE 392*b*, then if a change in the external exchange value is detected by the system 390 and the reference value parameter changes 394*a*, the internal exchange value will be set to the reference value 394*b*, the title parameter will change to identify SAS 394*c*, a new data parcel (a data parcel parallel) will be created 394*d* identical to the original data parcel including the original title parameter, except that the security parameter is set to TRUE 396*a* and the internal exchange value will not be changed 396*b* even if the external exchange value changes 390 and the reference value changes 394*a*.

Circulation data is a uniform data type which is handled by the system according to title parameters and quantity parameters. The title parameters and quantity parameters indicate the account system under which a given set of circulation data is controlled and the quantity thereby controlled. A set of circulation data may have a quantity parameter of any number, but a single unit of circulation data must have a quantity parameter of one. Circulation data is fungible, in that what is defined as a single unit of circulation data of any given type is equal to and can be replaced by or exchanged with another unit of circulation data of the same type. Circulation data may be portioned, i.e., divided into sets of differing units, and the title parameters may be changed from one account system to another. In one embodiment in which there is only one type of circulation data, circulation data sets do have internal exchange values, but they are not parameterized because the internal exchange values of data parcels are measured by circulation data quantities, and thus the circulation data internal exchange values are functionally equivalent to their quantity parameters. In another embodiment, the system has multiple circulation data types, nominally referenced as circulation type one, circulation type two, and so on. In this version, the internal exchange values of data parcels are measured by quantities of a designated circulation data type and each circulation data type has an internal exchange value measured by the quantity of the same designated circulation data type.

Figure 4A:
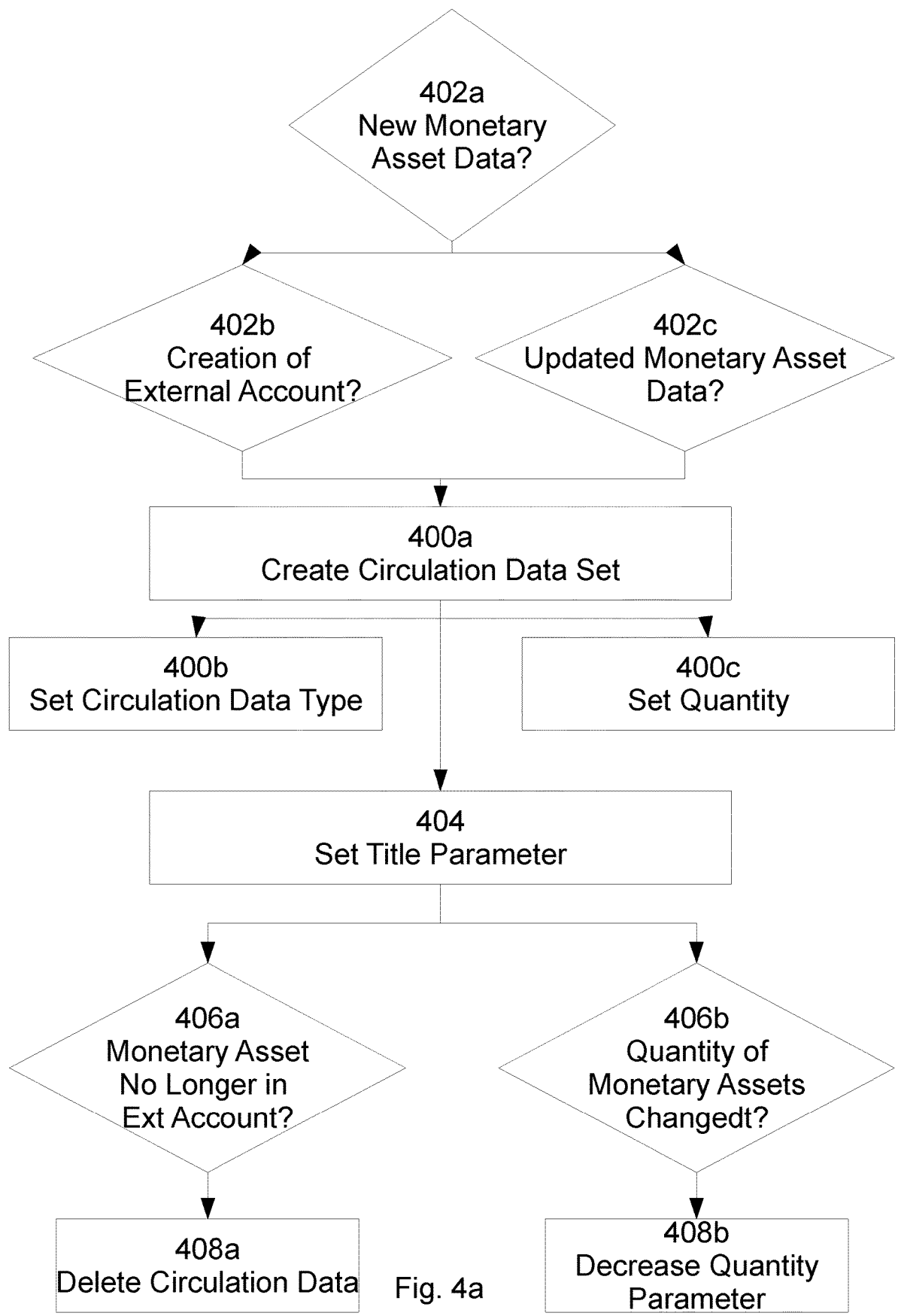
FIG. 4a is a flowchart showing an exemplary circulation data set creation, deletion, and quantity reduction method.

As shown in FIG. 4*a*, a set of circulation data may be created 400*a* and the circulation data type 400*b* and quantity set 400*c* upon receiving new monetary asset data from an external account 402*a*, particularly an external monetary account or an external monetary transfer account. The new monetary asset data may comprise data pertaining to the creation of an external account 402*b*, such as the creation of an external monetary account or external monetary transfer account with identification of the initial funding thereof, or based on updated monetary asset data 402*c*, with the updated monetary asset data also obtained from an external account and pertaining to changes to existing monetary assets. The title parameter may be set automatically 404 based on the account system coupled to the external accounts from which the new monetary asset data is received. If the system received new monetary asset data from an external account indicating that the basis for the circulation data no longer exists, e.g., the monetary assets are no longer in the external account 406*a*, then the system may delete the set of circulation data 408*a*. If the new monetary asset data indicates that the underlying quantity of the monetary assets has changed 406*b*, then the system may proportionately decrease the quantity 408*b*.

Figure 4B:
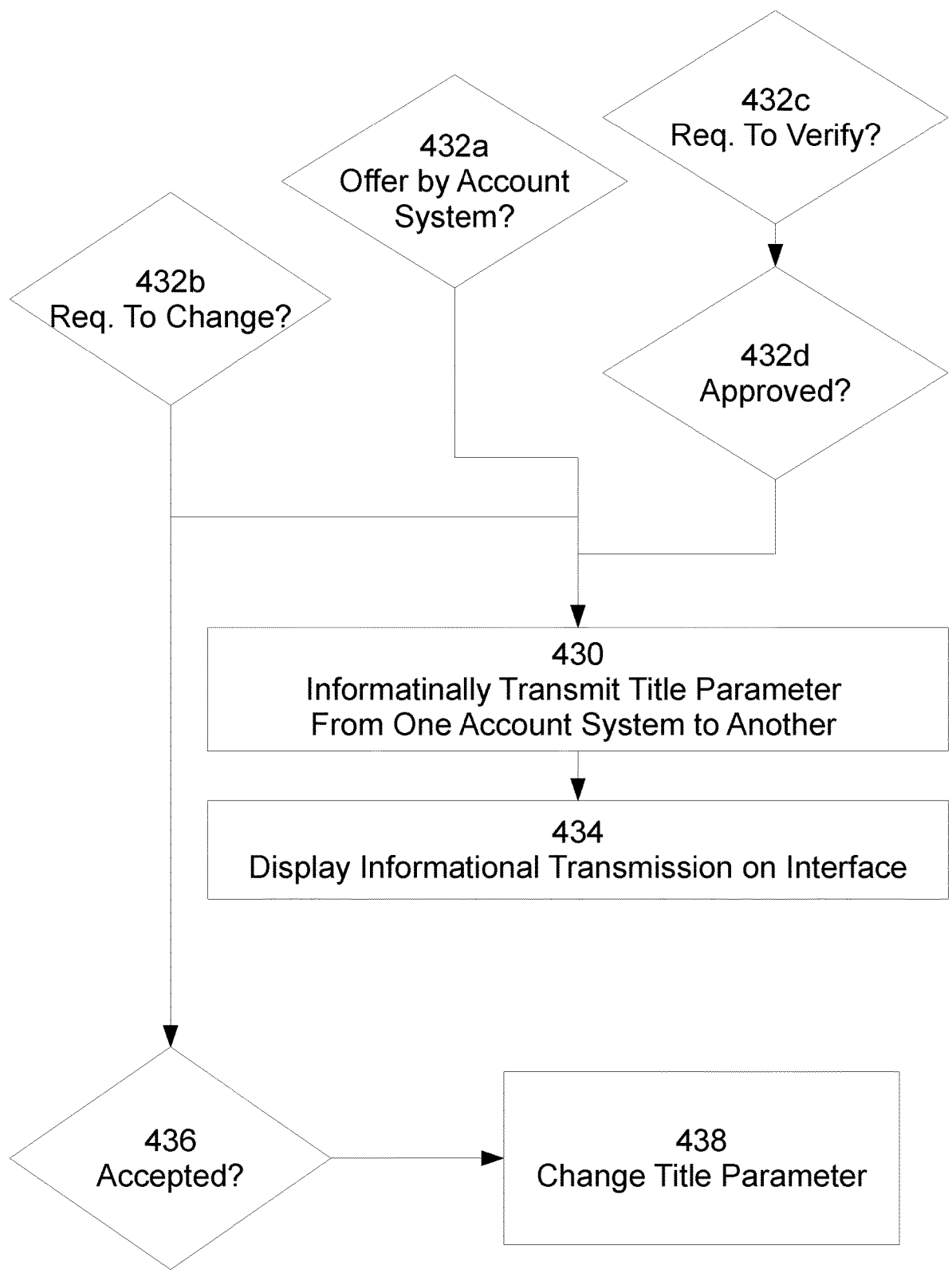
FIG. 4b is a flowchart showing an exemplary circulation data set title transmission and change method.

As shown in FIG. 4*b*, the title parameter of a set of circulation data may be informationally transmitted 430 from one account system (the account system identified by the title parameter, i.e., the identified account system) to another account system if an offer to change the title parameter from the identified account system to the other account system is made by the identified account system to the other account system 432*a*, or if a request to change the title parameter is sent by the other account system to the identified account system 432*b*, or if a request to merely verify the title parameter is requested 432*c*. A request to verify the title parameter may require approval from the identified account system 432*d* before informational transmission of the title parameter occurs. The informational transmission may be thereafter displayed on an interface for a user of the other account system to see 434. If the offer or request for change are accepted 436, then the title parameter is in fact changed from the identified account system to the other account system (the newly identified account system) 438.

Figure 4C:
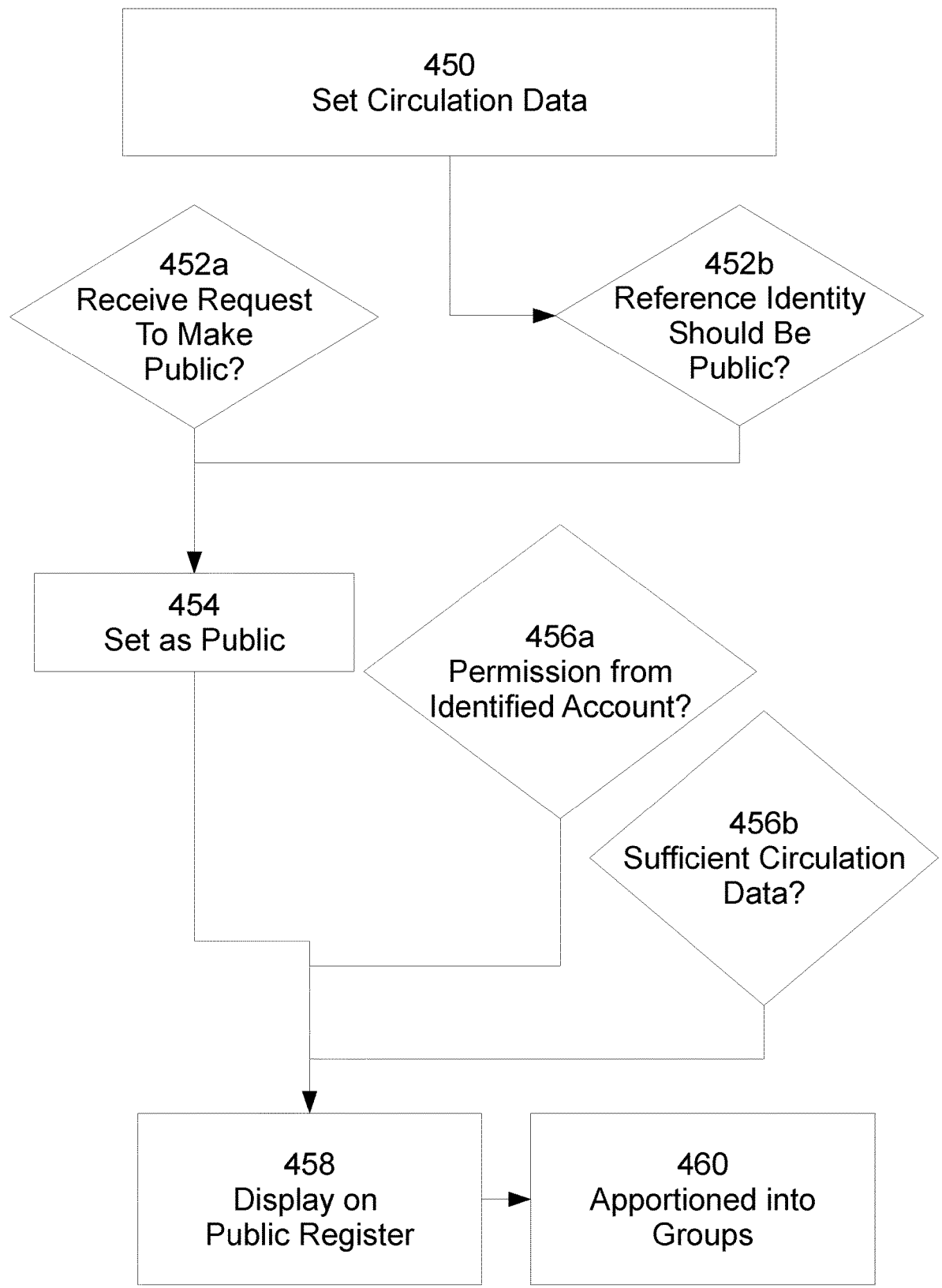
FIG. 4c is a flowchart showing an exemplary circulation data set display method.

As shown in FIG. 4*c*, the circulation data type for a set of circulation data may be initially set 450 by the system based on the new monetary asset data discussed earlier. The system may receive a request from the identified account system to make the set of circulation data public or private 452*a* or may automatically set the set of circulation data as private or public based on the circulation data type 452*b*. The public/private setting may be saved as a visibility parameter associated with the set of circulation data. If a set of circulation data is set as public 454, it may be displayed along with other parameters of the set of circulation data in a public register 458. These other parameters may include the title parameter, the circulation data type, the quantity, the internal exchange value parameter, and/or the security parameter. The public register may be displayed on an account system interface. A given set of circulation data set as public may be displayed on the account system interface 456*b* if the accessing account system has permission from the identified account system 458*a* or if the viewing account system has circulation data with a quantity parameter and/or internal exchange value deemed sufficient by the system such that the identified account system might receive authorization to change the title parameter from the identified account system to the accessing account system 456*b*. The display of the public register may be apportioned into separate interface tabs, columns, or other organizational display divisions 460, with apportionments applied in order to group identified account systems, reference identities, reference identity classes, etc. Display of circulation data may be color coded according to circulation data type.

Figure 4D:
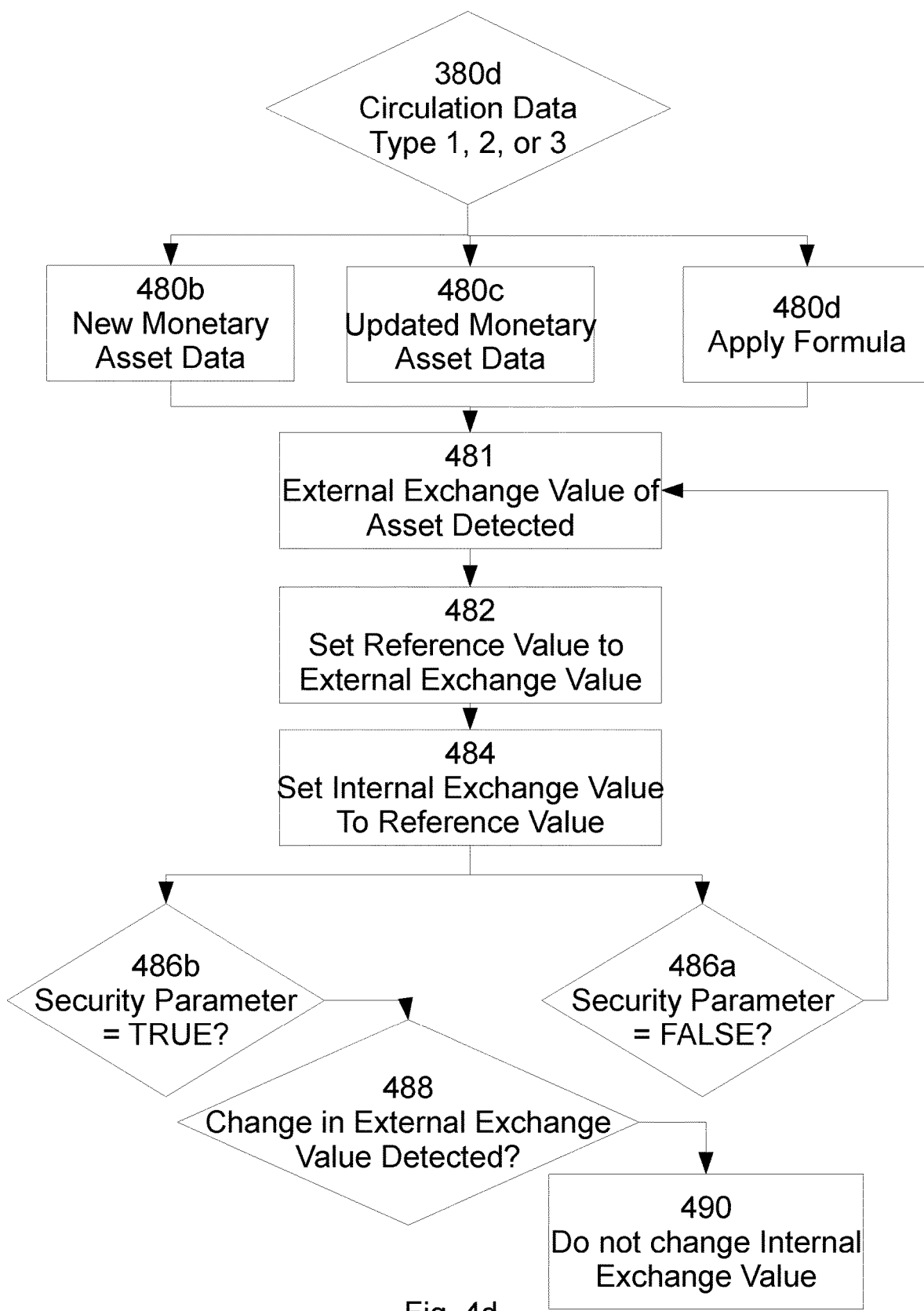
FIG. 4d is a flowchart showing an exemplary circulation data set securitization method.

As shown in FIG. 4*d*, depending on circulation data type 480*a*, the external exchange value of a set of circulation data may be initially detected or determined 481 by the system based on the new monetary asset data 480*b*, based on updated monetary asset data 480*c*, based on formulas set by the system and which take into account the relative external exchange values of various currencies and securities 480*d*, or based on formulas set by the system and which take into account the relative internal exchange values of various circulation data types. The updated monetary asset data may be also obtained from an external account and pertaining to monetary assets corresponding to the circulation data type. The formulas enable the calculation of internal exchange values and may be updated based on currency and securities data such as the value of the US dollar vis-a-vis the Euro and/or the value of a particular stock or set of stocks in terms of a particular currency. Thus, certain circulation data types may have their internal exchange values based on qualities pertaining to the monetary assets described by the new monetary asset data whereas other circulation data types may have their internal exchange values based on system formulae.

Formulae may include calculations involving the internal exchange values of other circulation data types, the total quantity of all circulation data sets of a given type, the external exchange value of some asset referenced by a data parcel, and so on. For example, circulation data type two may have an internal exchange value equal to the internal exchange value of circulation data type one, times the external exchange value of an ounce of gold, divided by the total quantity of all circulation data type two.

The value parameter of a circulation data set may be initially set to the external exchange value 482 and the internal exchange value parameter may be set to the value parameter 484. If a change in the external exchange value is detected by the system based on updated monetary asset data and the security parameter is set to FALSE 486*a*, then the value is set to the new external exchange value 481 and the internal exchange value is set to the value 484. However, if the security parameter is changed from FALSE to TRUE 486*b*, then even if a change in the external exchange value is detected by the system 488*b* or the value parameter changes, the internal exchange value will not change 490.

Figure 4E:
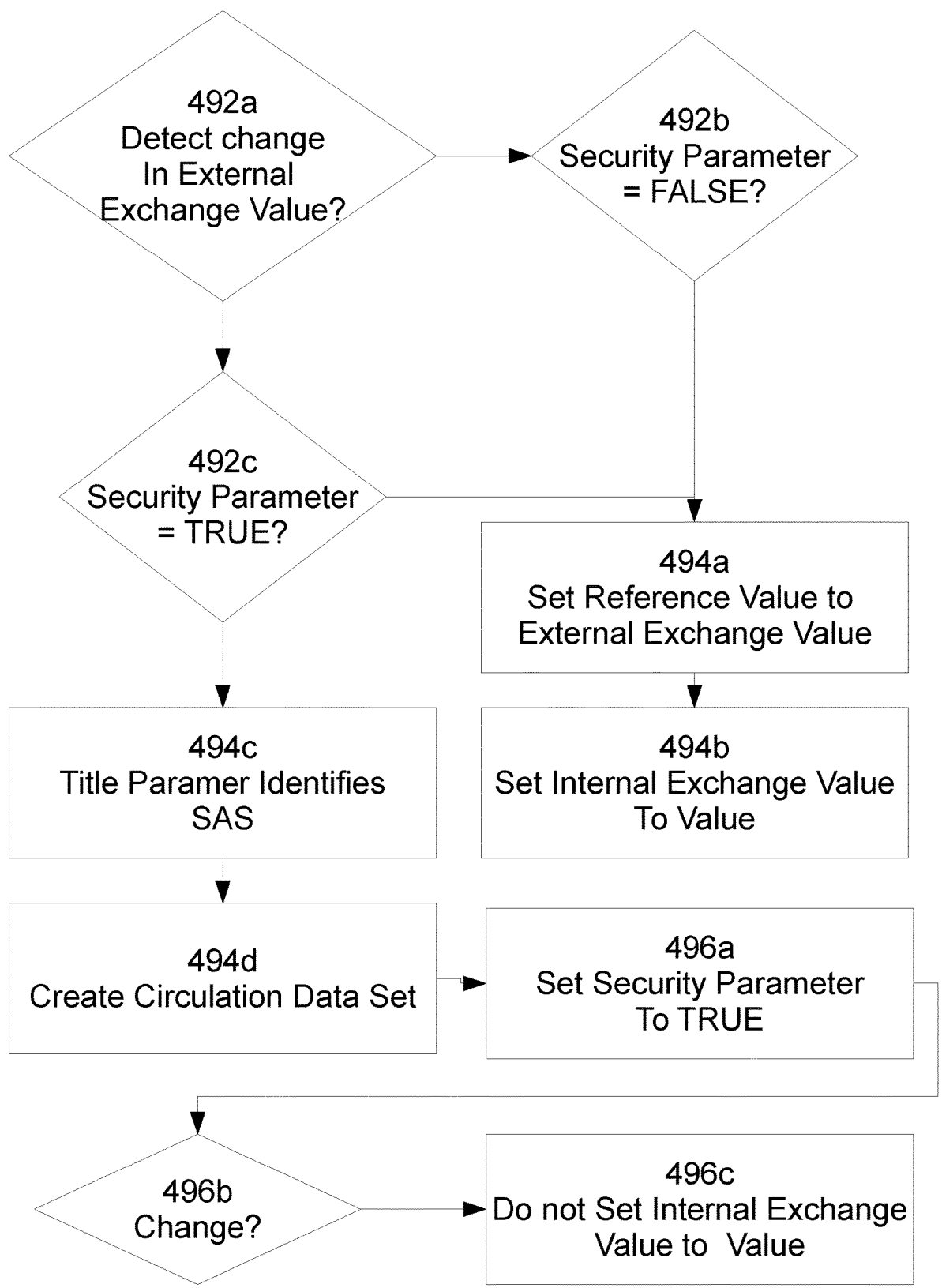
FIG. 4e is a flowchart showing an exemplary circulation data set securitization method in which control over a first circulation data set is given to SAS and a second circulation data set is created for the account system.

In one variation, as shown in FIG. 4*e*, if a change is the external exchange value of a set of circulation data is detected by the system based on updated monetary asset data 492*a* and the security parameter is set to FALSE 492*b*, then the value is set to the new external exchange value 494*a* and the internal exchange value is set to the value 494*b*. However, if the security parameter is changed from FALSE to TRUE 492*c*, then if a change in the external exchange value is detected by the system 492*a* and the value parameter changes 494*a*, the internal exchange value will be set to the value 494*b*, the title parameter will change to identify SAS 494*c*, a new set of circulation data will be created 494*d* identical to the original set of circulation data including the original title parameter, except that the security parameter is set to TRUE 496*a* and the internal exchange value will not be changed 496*c* even if the value or and external exchange value change 496*b*.

Figure 5A:
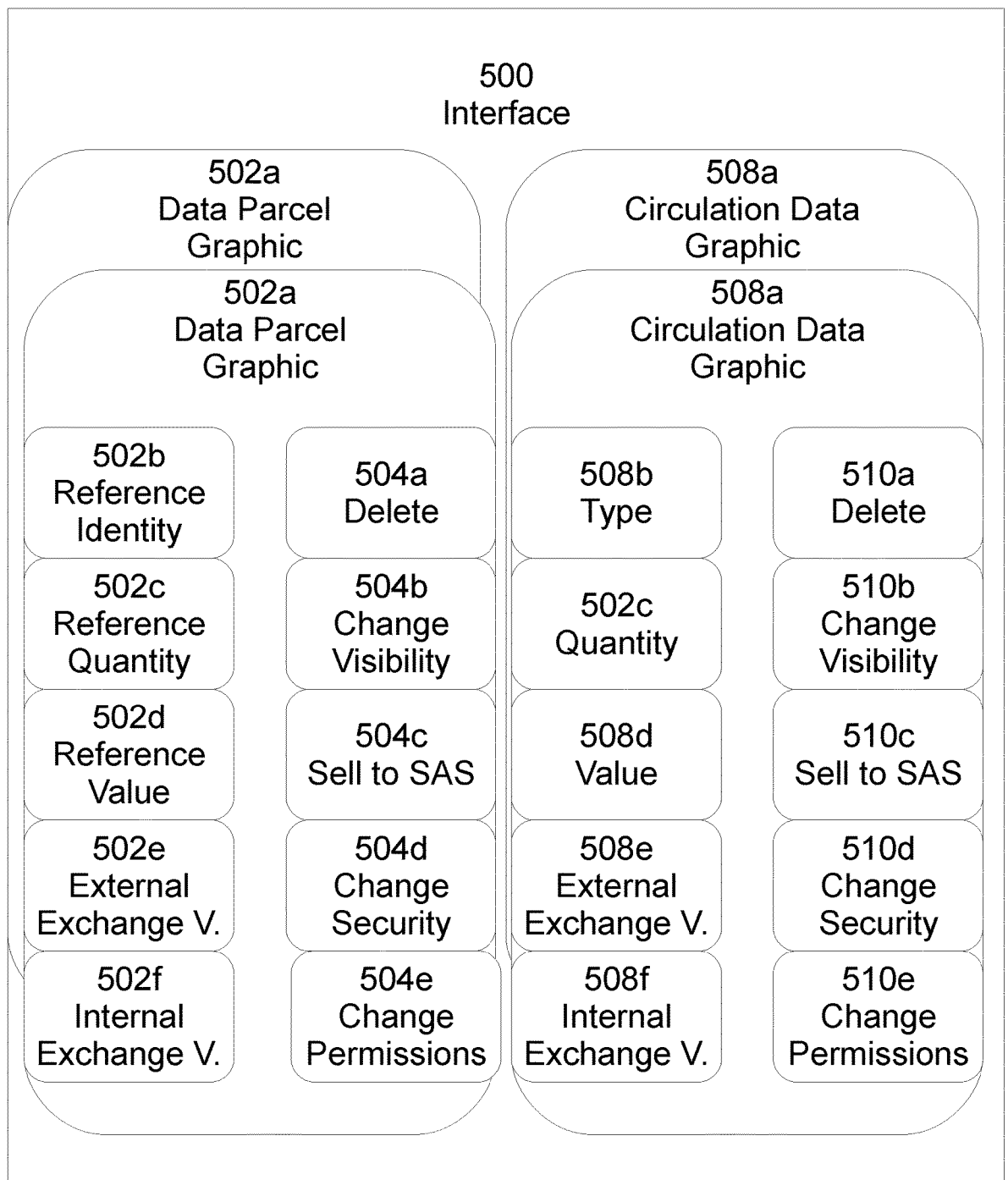
FIG. 5a shows an exemplary account system interface.

As shown in FIG. 5*a*, the platform may provide an interface 500 to display all of the data parcels having title parameters identifying a given account system. This display is distinct from the public register in that only the data parcels having title parameters identifying a given account system are displayed and the interface on which the display occurs is only accessible via the identified account system. The interface may display a graphical representation of each data parcel 502*a*, the reference identity 502*b*, reference quantity 502*c*, reference value 502*d*, the external exchange value 502*e*, the internal exchange value parameters 502*f*, as well as a set of actions under the control of the account system, such as deleting the data parcel 504*a*, changing the visibility parameter 504*b*, exchange (e.g., sell) the data parcel or a sub-quantity thereof to the SAS 504*c*, or changing the security parameter 504*d*. Similarly, the interface may display all the circulation data having title parameters identifying the given account system, including a graphical representation of the sets of circulation data 508*a*, the circulation data type 508*b*, quantity 508*c*, value 508*d*, the external exchange value 508*e*, the internal exchange value parameters 508*f*, as well as a set of actions under the control of the account system, such as deleting the circulation data set 510*a*, changing the visibility parameter 510*b*, sell the circulation data set or a sub-quantity thereof to the SAS 510*c*, or changing the security parameter 510*d*. For the Data Parcels and the Circulation Data sets, Passive Permission settings can also be accessed via graphics 504*e*, 510*e*. If the account system is identified by the title parameters of multiple types of circulation data, then each type with its corresponding quantity parameter will be graphically represented. The Data Parcel and Circulation Data graphics may be displayed all at once, in a stacked pile, or in a plurality of stacked piles. The Interface may be displayed on a display device connected to or integrated into a computing device or smart device.

Figure 5B:
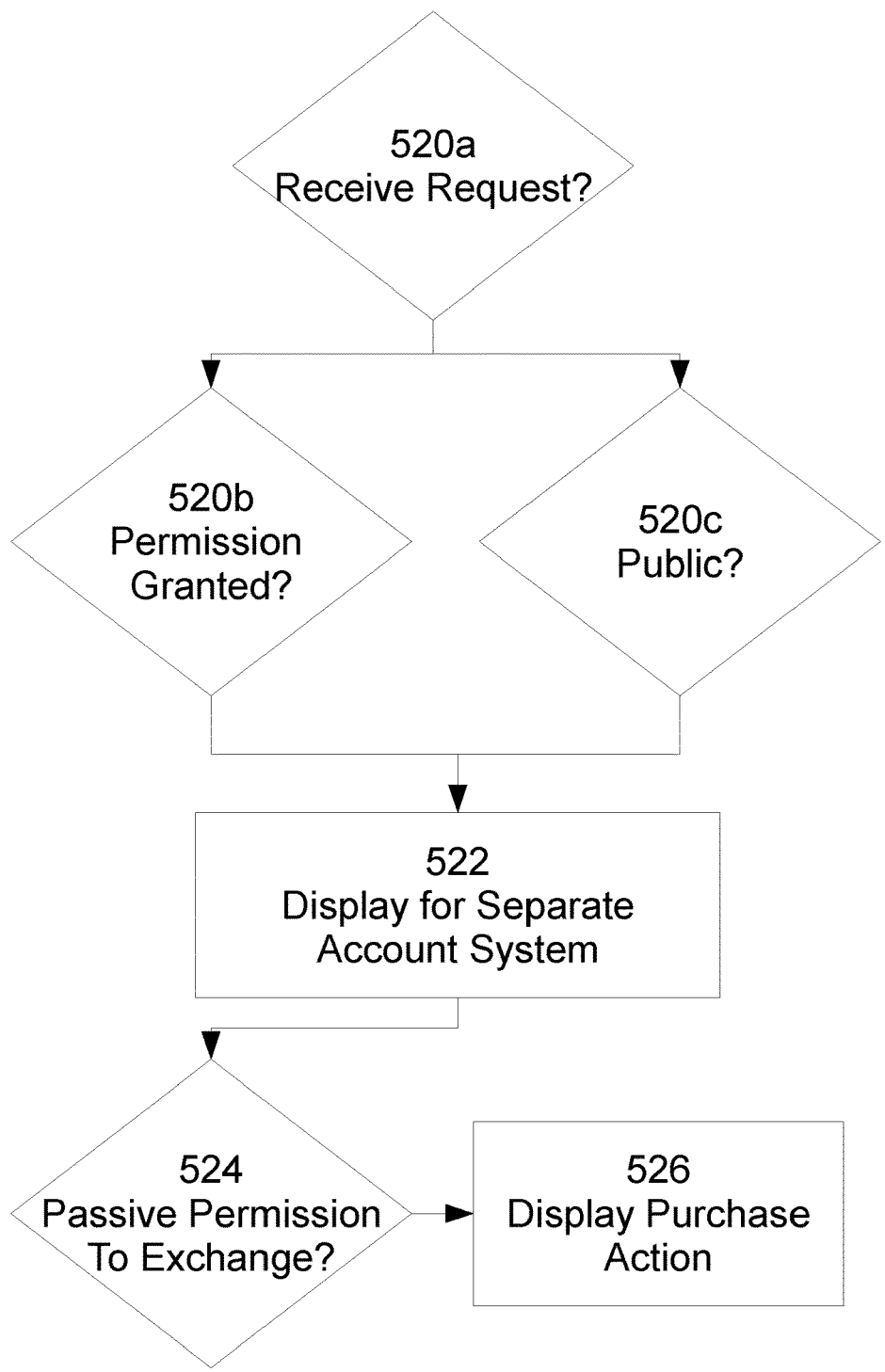
FIG. 5b is a flowchart showing an exemplary data parcel and circulation data set display method.

Generally, the interface displaying the data parcels and the circulation data is only displayed on the set of computers authorized to access the given account system, but as shown in FIG. 5*b*, upon receiving a request from a (separate) accessing account system 520*a* and permission from the given account system 520*b*, or in lieu of permission, an detection of a public parameter 520*c*, the interface may display the data parcels and/or the circulation data on a set of computers authorized to access the accessing account system 522. However, the display of data parcels or circulation data sets for the accessing account system may feature different actions. If the system determines that the data parcel or circulation data set can be exchanged with the accessing account system 524 based on Passive Permission settings, a purchase action may be enabled (and displayed) 526. Permission may be limited to the communication or display of thresholds relating to the data parcels and the circulation data, such as whether quantity parameters exceed a particular number.

In one embodiment, circulation data parameters for a given account system is determined by data from an external bank account coupled to the given account system and data parcels parameters are determined by data from an external brokerage account coupled to the given account system.

Data parcels parameters may also be determined based on deeds or titles, such as real property title documents uploaded to the account system. Documents may also provide additional information relating to the portion of equity in, for example, real estate, and what portion is still owned by the bank via a mortgage. The data parcel parameters may be updated based on a reoccurring schedule, such as monthly. The updates may occur based on predictions of when events relating to the assets occur, such as if there is a history of monthly mortgage payments for the same amount each month. Verification of the updates may occur according to a different periodicy, such as bi-annually. The Documentation may be physically scanned or otherwise transmitted to the system.

In one version, the reference quantity parameters for data parcels, whether determined by real property title documents or external brokerage accounts, must be positive rational numbers, because it is possible for an individual to own merely a fraction of an asset but not possible to own a negative fraction of an asset. In another version, the quantity parameters for circulation data may also be negative rational numbers because it is possible and even common for individuals to be in financial debt. Quantity parameters can never be irrational numbers.

The system may create loan documentation for users to sign, with the assets serving as collateral for the loan, and the loan constituting, at least in part, circulation data and/or data parcels.

In one embodiment, data parcels and circulation data may both be supported using blockchain technology. Thus, changes to each data parcel and circulation data set may be recorded in a ledger forming at least part a ledger parameter of each data parcel and circulation data set. Thus, SAS is unable to make changes to data parcels or circulation data sets without those changes appearing in the data parcels and circulation data sets themselves.

Figure 6:
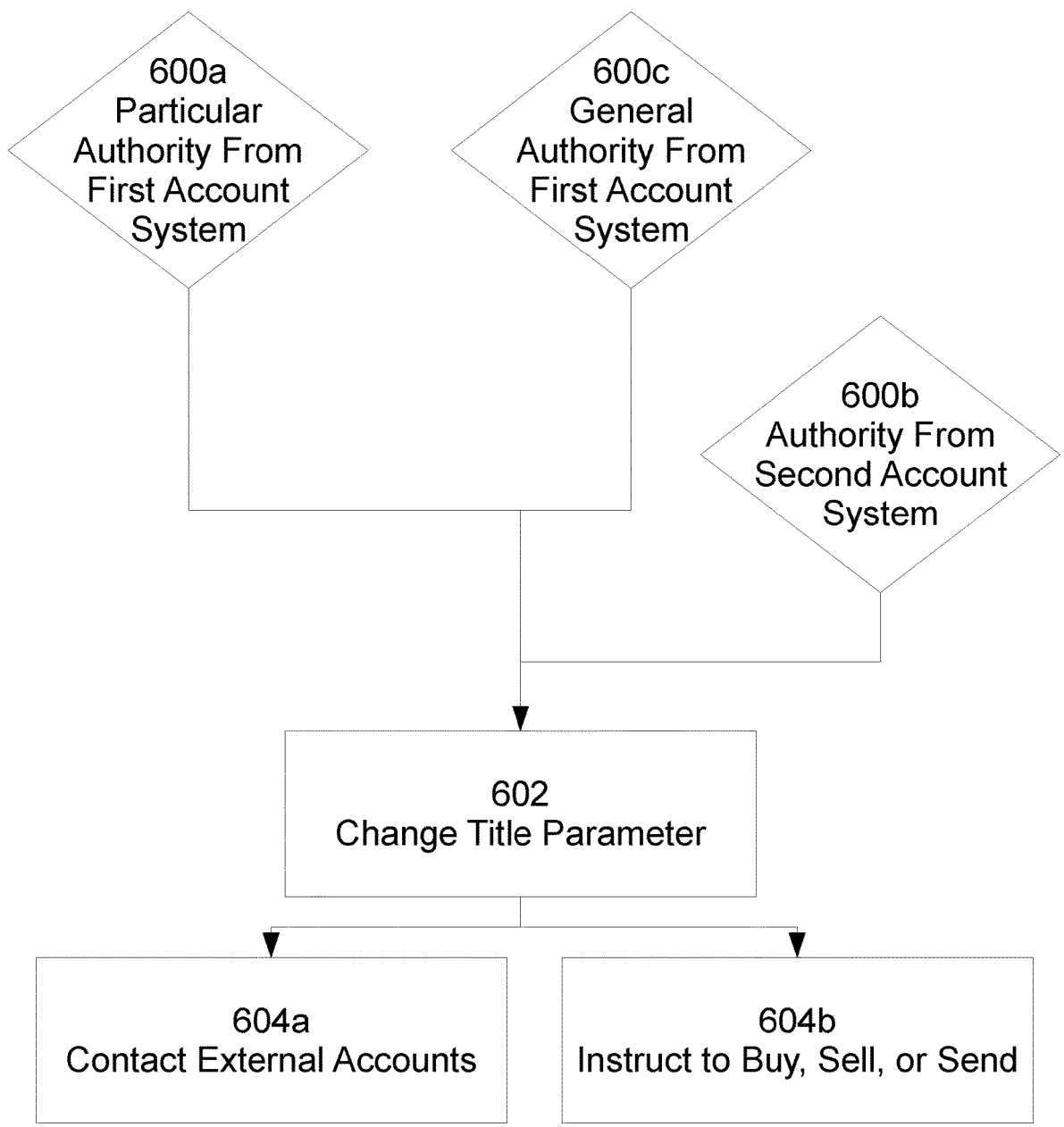
FIG. 6 is a flowchart showing an exemplary exchange method.

As shown in FIG. 6a, upon receiving authority from a first account system 600a, the system may change the title parameter for a first data parcel or a first set of circulation data from the first account system to the second account system 602. Authority from the first account system for a change in the title parameter of the first data parcel or the first set of circulation data may be incumbent on receiving permission from the second account system 600b to change the title parameter of either a second data parcel or a second set of circulation data from the second account system to the first account system; thus, both account systems must authorize or permit title parameter changes to the data parcels and/or circulation data from identifying themselves to identifying the other account system. This is considered an exchange by the system. Authority is active in that it is a request or command from an account system to change a parameter of a data parcel or circulation data controlled by another account system, whereas permission is passive in that it acquiesces with respect to a parameter change over which it has control. However, both active authority and passive permission may be set based on the application of rules upon the detection of events, and therefore, from hereon, unless otherwise noted, both authority and permission will be referred to as, uniformly, authority. The data parcel or circulation data for which a parameter change is authorized will be referred to as the "target".

Passive permission limitations available to any given account system may include automatic rejection of requests to exchange data parcels or circulation data sets controlled by the account system for data parcels or circulation data with security parameters set to FALSE, or security parameters set to TRUE, or circulation data of a type pegged to a particular currency such as USD or Bitcoin, or data parcels with reference identity parameters corresponding to certain commodities such as gold or to certain stocks such as oil companies. In this way, a given account system may operate as a technical exchange boycott of the objects of those limitations. Passive permission limitations may also be imposed on data parcels or circulation data sets it controls, such that requests made by other account systems to exchange for those data parcels or circulation data sets, not matter what the offer includes, is automatically rejected. In this way, an account system may maintain control over a given data parcel or circulation data set without having to actively reject offers of exchange.

Passive permission limitations may also be imposed on data parcels or circulation data sets with respect to a particular quantity, such that permission is given for data parcels with a particular reference identity parameter or circulation data of a particular type until a set threshold quantity is reached, and afterward it is denied. Quantity based passive permission limitations may also be applied to the exchange of data parcels or circulation data controlled by the account system, such that permission is given for their exchange until a minimum quantity remains under the account system's control. In this way, account systems may ensure that they maintain a sufficient quantity of particular data parcels or circulation data, or are exposed to an acceptable quantity of the same.

Title change authority with respect to data parcels or circulation data sets referencing a given account system may be communicated to the system by a user in control of the given account system via the account system interface.

Returning to FIG. 6, the authority 600a described here may be particular, with the target of a title parameter change being an actual, particular data parcel, or general, with the target being any sufficient data 600c parcel and/or circulation data and/or combination thereof, with sufficiency being determined by the internal exchange value parameters and quantity parameters of the data parcels and/or circulation data. For example, sufficiency for a first account system data parcel vis-a-vis a second account system data parcel exists if the first account system data parcel's internal exchange value parameter times its quantity parameter is equal to or greater than the internal exchange value times the quantity parameter of the second account system data parcel. Authority may also be specified to a portion of a particular data parcel, such that a quantity less than the quantity parameter is specified for title parameter change, in which case the target will be divided into portions or subsets. For title change, either or both the first and second account systems must give particular authority as it would be incoherent for both to give merely general authority.

Particular authority with respect to a target may be communicated by the user selecting via the interface the data parcel or circulation data set having the title parameter the user desires to change. General authority may be communicated implicitly if particular authority is communicated only in respect to a data parcel or circulation data set identifying one account system but not in respect to a data parcel or circulation data set identifying the other account system.

In one embodiment, if the authority is particular with respect to both the first and second data parcels but the internal exchange value of the first data parcel is more than the second data parcel, then the system may divide the first data parcel ($P_F$) into data parcel portions ($P_{F1}$ and $P_{F2}$), such that each of the data parcel portions have reference quantities being complimentary fractions of the original reference quantity ($Q_F$), such that one data parcel portion reference quantity ($Q_{F1}$) is the original reference quantity minus the other data parcel portion reference quantity ($Q_{F2}$). Thus, $Q_{F1}=Q_F-Q_{F2}$, or $Q_{F1}+Q_{F2}=Q_F$. The division of $P_F$ into $P_{F1}$ and $P_{F2}$ should be such that the internal exchange value of the first data parcel ($V_F$) times the reference quantity of the one data parcel portion ($R_{F1}$) is equal to the internal exchange value of the second data parcel or set of circulation data ($V_S$). Thus, $(V_F)*(Q_{F1})=V_S$, assuming the reference quantity parameter of the second data parcel is singular; otherwise, $(V_F)*(Q_{F1})=(V_S)(Q_S)$, with $Q_S$ being the quantity parameter of the second data parcel. The system will change the title parameter of the first data parcel portion but retain the original data parcel title parameter for the second data parcel portion. Thus, a portion of the first data parcel is exchanged for the second data parcel.

In another embodiment, if the authority is particular with respect to both the first and second data parcel but the internal exchange value of the first data parcel is more than the second data parcel, then the second set of circulation data will be divided into a first and second subset of the second set of circulation data, such that $(V_F)*(R_F)=(V_S)(Q_S)+(V_{SC})(Q_{SC1})$, with $V_{SC}$ being the internal exchange value of the second set of circulation data and $Q_{SC1}$ being the quantity parameter of the first subset of the second set of circulation data. The system will change the title parameters of the first data parcel, the second data parcel, and the first subset of the second set of circulation data. Thus, the first data parcel is exchanged for the second data parcel in addition to a subset of the second set of circulation data.

In one variation, if a. the second account system is identified by the title parameter of the second set of circulation data as well as a third set of circulation data, b. the second and third sets of circulation data are of different types, and c. the internal exchange value of the first data parcel is more than the second data parcel and the second set of circulation data, then the third set of circulation data will be divided into a first and second subset of the third set of circulation data, such that $(V_F)*(R_F)=(V_S)(Q_S)+(V_{SC})(Q_{SC})+(V_{TC})(Q_{TCB1})$, with $V_{SC}$ being the internal exchange value of the second set of circulation data, $Q_{SC}$ being the quantity parameter of the second set of circulation data, $V_{TC}$ being the internal exchange value of the third set of circulation data, and $Q_{TC1}$ being the quantity parameter of a first subset of the third set of circulation data. Thus, the first data parcel is exchanged for the second data parcel in addition to two types of circulation data—all of the second set, and a subset of the third set.

In one embodiment, if authority is particular only with respect to the second data parcel and the internal exchange value of the first set of circulation data exceeds the internal exchange value of the second data parcel, the system will first perform the division step with the first set of circulation data and change the title parameters of a first subset of the first set of circulation data and the second data parcel. Thus, the first set of circulation data is exchanged for the second data parcel. But if the internal exchange value of the first set of circulation data does not exceed the internal exchange value of the second data parcel, then the system shall perform a division step with the first data parcel and change the title parameters of the first set of circulation data, a first portion of the first data parcel, and the second data parcel. Thus, the first set of circulation data is insufficient to be exchanged for the second data parcel.

In another embodiment, if authority is not only particular with respect to both the first and second data parcel but also specified with respect to a reference quantity of a first data parcel portion, and the reference quantity of the first data parcel portion times the internal exchange value of the first parcel portion is less than the reference quantity times the internal exchange value of the second parcel portion, then the system will divide the second data parcel such that $(V_F)*(Q_{F1})=(V_S)(Q_{S1})$. Thus, a specified portion of the first data parcel is exchanged for a calculated portion of the second data parcel. However, if $(V_F)*(Q_{F1})>=(V_S)(Q_S)$, then the system may compute an error which may be displayed on the interface. Similarly, if authority is particular with respect to both the first and second data parcel but also specified with respect to a reference quantity of a second data parcel portion, and the reference quantity of the second data parcel portion times the internal exchange value of the second parcel portion is less than the reference quantity times the internal exchange value of the first parcel, then the system will divide the first data parcel also such that $(V_S)*(Q_{S1})=(V_F)(Q_{F1})$. If $(V_S)*(Q_{S1})>=(V_F)(Q_F)$, then the system may compute an error which may be displayed on the interface.

In one embodiment, the interface displays to the user(s) of the account system the internal exchange value equivalence between some data parcels and/or circulation data sets. More precisely, the interface may display the quantity and internal exchange value parameters on one side of the exchange and the quantity and internal exchange value parameters on the other side of the exchange, with the parameters on one side changing in real-time as the user changes particular authority with respect to the quantity parameter on the other side of the exchange.

After title parameter change activities occur between account systems 602, the system may transmit data to the external accounts coupled to the account systems 604a, such as external bank and brokerage accounts, using the login credentials saved to the account systems. This transmitted data may correspond to instructions 604b to the external bank or brokerage accounts to buy, sell, or send assets to the external bank or brokerage accounts coupled to other account systems, including the bank or brokerage accounts coupled to the SAS.

The system may similarly transmit data to the external accounts coupled to the account systems in response to receiving instructions to change the security parameters of one or more data parcels to TRUE. In this case, the system is essentially selling the asset referenced by an original data parcel via the account system's external brokerage account and buying it via the brokerage account coupled to the SAS.

The system may close an account system if it determines that the data obtained from the external accounts is fraudulent, or that the data parcels or sets of circulation data are affiliated with criminal activity. The closure of an account system may result in a system deletion of the account system. In one variation, if an account system is deleted, the data parcels and sets of circulation data controlled by that account system will be deleted. In another variation, the title parameters will be changed from the account system to SAS.

A system may also close an account system if it receives a request from the account system itself. This request may be initiated directly by a user of the account system or programmed as an outcome based on a condition precedent. In one variation, closure of an account system may result in a deletion of all data parcels and circulation data sets controlled by the user. In another variation, the data parcels and circulation data sets are simply frozen—i.e., their parameters cannot be changed, all requests to change the parameters are rejected, etc.

The system may receive data from the external accounts coupled to the account systems, and automatically update the various parameters of data parcels or circulation data in response to that received data. The system may also update the parameters in response to data it receives from the brokerage account coupled to the SAS. Such updates may include reference value parameters, which could be based on external exchange rates of the referenced assets vis-a-vis other assets, such as stocks, bonds, cryptocurrencies, or government-issued currency.

Account systems may be coupled to unique portals or interfaces based on account system type. Account system types may include a professional seller account system, a casual seller account system, a buyer account system, and an investor account system. Account system types may also consist of hybrids, such as an account system with portals and interfaces adapted to both the buyer account system and the investor account system. The account systems may differ based on their default settings such as whether the security parameter of data parcels is set to TRUE or FALSE, whether the account system has permission to change the security parameter of its data parcels, or whether the account system may be coupled to certain external accounts. Another difference may include the kinds of interactions with other account system a given account system may engage in. For example, certain account systems may only be able to interact with SAS but not other account systems.

The invention claimed is:

1. A securitization and exchange system comprising a set of account systems and a set of computers connected over a network, with each account system being informationally connected to a set of corresponding external accounts, the set of computers programmed to:
   a. transmit instructions from each account system to the set of corresponding external accounts and receive data relating to assets from the set of corresponding external accounts;
   b. create data parcels using the data relating to assets, with a first data parcel comprising a title parameter which identifies a first account system, a reference identity parameter which identifies a asset, a quantity parameter which identifies a quantity of the asset, a reference value parameter which identifies an external exchange value of the asset, an internal exchange value parameter which initially tracks and equals the external exchange value, and a security parameter which may be changed from 'unsecure' to 'secure';
   c. upon creating the first data parcel, transmit instructions from the first account system to the set of corresponding external accounts to sell the asset, then transmit instructions from an administrative account system to external accounts corresponding to the administrative account system to buy the asset;
   d. upon receiving a request from the first account system to change the security parameter of the first data parcel from 'unsecure' to 'secure', cease the internal exchange value parameter of the first data parcel from tracking the external exchange value;
   e. upon receiving a request from the first account system to exchange an unfixed quantity of the first data parcel for a fixed quantity of a second data parcel assigned to a second account system:
      i. determine an internal exchange value of the fixed quantity of the second data parcel,
      ii. then calculate an appropriate quantity of the first data parcel which, when multiplied by the internal exchange value of the first data parcel, is equal to the internal exchange value of the fixed quantity of the second data parcel,
      iii. then decrease the quantity parameter of the first data parcel by the appropriate quantity and the quantity parameter of the second data parcel by the fixed quantity,
      iv. then create a first data parcel portion which is identical to the first data parcel and a second data parcel portion which is identical to the second data parcel except that the quantity parameter of the first data parcel portion is set to the appropriate quantity, the quantity parameter of the second data parcel portion is set to the fixed quantity, the title parameter of the first data parcel portion identifies the second account system, and the title parameter of the second data parcel portion identifies the first account system.

2. The securitization and exchange system of claim 1, with the assets from the set of corresponding external accounts being securities.

3. The securitization and exchange system of claim 1, with the set of corresponding external accounts including brokerage accounts.

4. The securitization and exchange system of claim 1, with the first data parcel additionally comprising a visibility parameter, with the set of computers additionally programmed to:
   a. display a graphical representation of the first data parcel on an interface accessible to a user of the first account system regardless whether the visibility parameter is set to 'private' or 'public',
   b. not display the graphical representation of the first data parcel on an interface accessible to a user of the second account system if the visibility parameter is set to 'private',
   c. but upon receiving a request from the first account system to set the visibility parameter to 'public', display the graphical representation of the first data parcel on the interface accessible to the user of the second account system.

5. The securitization and exchange system of claim 1, where the appropriate quantity may be a non-integer.

6. The securitization and exchange system of claim 1, with the set of computers additionally programmed to:
   a. upon receiving a request from the first account system to change the security parameter of the first data parcel from 'secure' to 'unsecure', upon detecting a change of a percent in the external exchange value parameter of the first data parcel, change the internal exchange value parameter of the first data parcel parallel by the percent.

7. The securitization and exchange system of claim 1, with the assets including currency and the set of computers additionally programmed to:
   a. create circulation data sets using the data relating to the currency, with a first circulation data set having a title parameter identifying the first account system, a circulation data type parameter corresponding to a type of the currency, a quantity parameter identifying the quantity of the currency, a reference value parameter which identifies an external exchange value of the currency, an internal exchange value parameter which initially tracks and is equal to the external exchange value, and a security parameter which may be changed from 'unsecure' to 'secure';
   b. upon creating the first circulation data set, transmit instructions from the first account system to the set of corresponding external accounts to send the currency to an external account corresponding to the administrative account system;
   c. upon receiving a request from the first account system to change the security parameter of the first circulation data set from 'unsecure' to 'secure', cease the internal exchange value parameter from tracking the external exchange value of the currency.

8. The securitization and exchange system of claim 7, with the set of computers additionally programmed to:
   a. upon receiving a request from the first account system to change the security parameter of the first circulation data set from 'secure' to 'unsecure', upon detecting a change of a percent in the external exchange value parameter of the first circulation data set, change the internal exchange value parameter of the first circulation data set by the percent.

9. A securitization and exchange system comprising a set of account systems and a set of computers connected over a network, with each account system being informationally connected to a set of corresponding external accounts, the set of computers programmed to:
   a. transmit instructions from each account system to the set of corresponding external accounts and receive data relating to assets from the set of corresponding external accounts;
   b. create data parcels using the data relating to assets, with a first data parcel comprising a title parameter which identifies a first account system, a reference identity parameter which identifies an asset, a quantity parameter which identifies a quantity of the asset, a reference value parameter which identifies an external exchange value of the asset, an internal exchange value parameter which initially tracks and is equal to the external exchange value, and a security parameter which may be changed from 'unsecure' to 'secure';
   c. upon receiving a request from the first account system to change the security parameter of the first data parcel from 'unsecure' to 'secure', create a first data parcel parallel identical to the first data parcel, except the title parameter of the first data parcel is assigned to the administrative account system and the title parameter of the first data parcel parallel is assigned to the first account system, the security parameter of the first data parcel parallel is set to 'secure' while the first data parcel continues to be set to 'unsecure', and the internal exchange value of the first data parcel parallel ceases to track the external exchange value of the first data parcel while the internal exchange value parameter of the first data parcel continues to track the external exchange value of the first data parcel;
   d. then, upon receiving a request from the first account system to change the security parameter of the first data parcel parallel from 'secure' to 'unsecure', upon detecting a change of a percent in the internal exchange value parameter of the first data parcel, change the internal exchange value parameter of the first data parcel parallel by the percent;
   e. then, upon receiving a request from the first account system to exchange an unfixed quantity of the first data parcel parallel for a fixed quantity of a second data parcel assigned to a second account system:
      i. determine an internal exchange value of the fixed quantity of the second data parcel,
      ii. calculate an appropriate quantity of the first data parcel parallel which, when multiplied by the internal exchange value of the first data parcel parallel, is equal to the internal exchange value of the fixed quantity of the second data parcel,
      iii. decrease the quantity parameter of the first data parcel parallel by the appropriate quantity and the decrease the quantity parameter of the second data parcel by the fixed quantity,
      iv. create a first data parcel parallel portion which is identical to the first data parcel parallel and a second data parcel portion which is identical to the second data parcel except that the quantity parameter of the first data parcel parallel portion is set to the appropriate quantity, the quantity parameter of the second data parcel portion is set to the fixed quantity, the title parameter of the first data parcel parallel portion identifies the second account system, and the title parameter of the second data parcel portion identifies the first account system.

10. The securitization and exchange system of claim 9, with the set of computers additionally programmed to:
    a. upon creating the first data parcel, transmit instructions from the first account system to the set of corresponding external accounts to sell the asset, then transmit instructions from an administrative account system to external accounts corresponding to the administrative account system to buy the asset.

11. The securitization and exchange system of claim 9, with the set of computers additionally programmed to:
    a. upon creating the first data parcel parallel, transmit instructions from the first account system to the set of corresponding external accounts to sell the asset, then transmit instructions from an administrative account system to external accounts corresponding to the administrative account system to buy the asset.

12. The securitization and exchange system of claim 9, where the appropriate quantity may be a non-integer, the assets are securities, and the set of corresponding external accounts including brokerage accounts.

13. The securitization and exchange system of claim 9, with the assets including a first currency, the set of corresponding external accounts including banking accounts, and the set of computers additionally programmed to:
    a. create circulation data sets using the data relating to the first currency, with a first circulation data set having a title parameter identifying the first account system, a circulation data type parameter corresponding to a type of the first currency, a quantity parameter identifying the quantity of the first currency, a reference value parameter which identifies an external exchange value of the first currency, an internal exchange value parameter which initially tracks and is equal to the external exchange value, and a security parameter which may be changed from 'unsecure' to 'secure';
    b. upon receiving a request from the first account system to exchange an unfixed quantity of the first data parcel parallel for a fixed quantity of a second data parcel assigned to a second account system:
       i. determine the internal exchange value of the fixed quantity of the second data parcel,
       ii. then calculate an appropriate quantity of the first circulation data set which, when multiplied by the internal exchange value of the first circulation data set, is equal to the internal exchange value of the fixed quantity of the second data parcel,
       iii. then decrease the quantity parameter of the first circulation data set by the appropriate quantity and the quantity parameter of the second data parcel by the fixed quantity, iv. then create a first circulation data subset which is identical to the first circulation data set and a second data parcel portion which is identical to the second data parcel except that the quantity parameter of the first circulation data subset is set to the appropriate quantity, the quantity parameter of the second data parcel portion is set to the fixed quantity, the title parameter of the first circulation data subset identifies the second account system, and the title parameter of the second data parcel portion identifies the first account system.

14. The securitization and exchange system of claim 13, the set of computers additionally programmed to:
   a. upon receiving a request from the first account system to change the security parameter of the first circulation data set from 'unsecure' to 'secure', create a first circulation data set parallel identical to the first circulation data set, except the title parameter of the first circulation data set is assigned to the administrative account system and the title parameter of the first circulation data set parallel is assigned to the first account system, the security parameter of the first circulation data set parallel is set to 'secure' while the first circulation data set continues to be set to 'unsecure', and the internal exchange value of the first circulation data set parallel ceases to track the external exchange value of the first circulation data set while the internal exchange value parameter of the first circulation data set continues to track the external exchange value of the first data parcel.

15. The securitization and exchange system of claim 13, the set of computers additionally programmed to:
   a. upon creating the first circulation data set, transmit instructions from the first account system to the set of corresponding external accounts to send the first currency to an external account corresponding to the administrative account system.

16. The securitization and exchange system of claim 13, the set of computers additionally programmed to create a second circulation data set, with the internal exchange value of the second circulation data set being calculated using the internal exchange value of the first circulation data set but not being equal to the internal exchange value of the first circulation data set.

17. The securitization and exchange system of claim 13, the set of computers additionally programmed to create a second circulation data set, with the internal exchange value of the second circulation data set being calculated using at least the external exchange value of a stock security and the external exchange value of a second currency.

18. The securitization and exchange system of claim 9, with the first data parcel additionally comprising a visibility parameter, with the set of computers additionally programmed to:
   a. display a graphical representation of the first data parcel on an interface accessible to a user of the first account system regardless whether the visibility parameter is set to 'private' or 'public',
   b. not display the graphical representation of the first data parcel on an interface accessible to a user of the second account system if the visibility parameter is set to 'private',
   c. but upon receiving a request from the first account system to set the visibility parameter to 'public', display the graphical representation of the first data parcel on the interface accessible to the user of the second account system.

19. A securitization and exchange system comprising a set of account systems and a set of computers connected over a network, with each account system being informationally connected to a set of corresponding external accounts, the set of computers programmed to:
   a. transmit instructions from each account system to the set of corresponding external accounts and receive data relating to assets from the set of corresponding external accounts, with the set of corresponding external accounts including banking and brokerage accounts and the assets including currency and stocks;
   b. create data parcels using the data relating to the stocks, with a first data parcel comprising a title parameter which identifies a first account system, a reference identity parameter which identifies a stock, a quantity parameter which identifies a quantity of the security, a reference value parameter which identifies an external exchange value of the stock, an internal exchange value parameter which initially tracks and equals the external exchange value, and a security parameter which may be changed from 'unsecure' to 'secure';
   c. create circulation data sets using the data relating to the currency, with a first circulation data set having a title parameter identifying the first account system, a circulation data type parameter corresponding to a type of the currency, a quantity parameter identifying the quantity of the currency, a reference value parameter which identifies an external exchange value of the currency, an internal exchange value parameter which initially tracks and is equal to the external exchange value, and a security parameter which may be changed from 'unsecure' to 'secure';
   d. upon receiving a request from the first account system to change the security parameter of the first data parcel from 'unsecure' to 'secure', cease the internal exchange value parameter of the first data parcel from tracking the external exchange value;
   e. upon receiving a request from the first account system to change the security parameter of the first data parcel from 'secure' to 'unsecure', upon detecting a change of a percent in the external exchange value parameter of the first data parcel, change the internal exchange value parameter of the first data parcel parallel by the percent;
   f. upon receiving a request from the first account system to change the security parameter of the first circulation data set from 'unsecure' to 'secure', cease the internal exchange value parameter from tracking the external exchange value of the currency;
   g. upon receiving a request from the first account system to change the security parameter of the first circulation data set from 'secure' to 'unsecure', upon detecting a change of a percent in the external exchange value parameter of the first circulation data set, change the internal exchange value parameter of the first circulation data set by the percent;
   h. upon receiving a request from the first account system to exchange an unfixed quantity of the first data parcel for a fixed quantity of a second data parcel assigned to a second account system:
      i. determine an internal exchange value of the fixed quantity of the second data parcel, with the fixed quantity not necessarily being an integer,
      ii. then calculate an appropriate quantity of the first data parcel which, when multiplied by the internal exchange value of the first data parcel, is equal to the internal exchange value of the fixed quantity of the second data parcel, with the appropriate quantity not necessarily being an integer, iii. then decrease the quantity parameter of the first data parcel by the appropriate quantity and the quantity parameter of the second data parcel by the fixed quantity, iv. then create a first data parcel portion which is identical to the first data parcel and a second data parcel portion which is identical to the second data parcel except that the quantity parameter of the first data parcel portion is set to the appropriate quantity, the quantity parameter of the second data parcel portion is set to the fixed quantity, the title parameter of the first data parcel portion identifies the second account system, and the title parameter of the second data parcel portion identifies the first account system;

i. upon receiving a request from the first account system to exchange a first unfixed quantity of the first circulation data set for a fixed quantity of the second data parcel:

i. determine an internal exchange value of the fixed quantity of the second data parcel, with the fixed quantity not necessarily being an integer, ii. then calculate a first appropriate quantity of the first circulation data set which, when multiplied by the internal exchange value of the first circulation data set, is equal to the internal exchange value of the fixed quantity of the second data parcel, with the first appropriate quantity not necessarily being an integer, iii. then decrease the quantity parameter of the first circulation data set by the first appropriate quantity and the quantity parameter of the second data parcel by the fixed quantity, iv. then create a first circulation data subset which is identical to the first circulation data set and a second data parcel portion which is identical to the second data parcel except that the quantity parameter of the circulation data subset is set to the first appropriate quantity, the quantity parameter of the second data parcel portion is set to the fixed quantity, the title parameter of the first circulation data subset identifies the second account system, and the title parameter of the second data parcel portion identifies the first account system;

j. upon receiving a request from the first account system to exchange a second unfixed quantity of the first circulation data set for a fixed quantity of a second circulation data set assigned to the second account system:

i. determine an internal exchange value of the fixed quantity of the second circulation data set, with the fixed quantity not necessarily being an integer, ii. then calculate a second appropriate quantity of the first circulation data set which, when multiplied by the internal exchange value of the first circulation data set, is equal to the internal exchange value of the fixed quantity of the second circulation data set, with the second appropriate quantity not necessarily being an integer, iii. then decrease the quantity parameter of the first circulation data set by the second appropriate quantity and the quantity parameter of the second circulation data set by the fixed quantity, iv. then create a first circulation data subset which is identical to the first circulation data set and a second circulation data subset which is identical to the second circulation data set except that the quantity parameter of the first circulation data subset is set to the second appropriate quantity, the quantity parameter of the second circulation data subset is set to the fixed quantity, the title parameter of the first circulation data subset identifies the second account system, and the title parameter of the second circulation data subset identifies the first account system.

20. The securitization and exchange system of claim 19, with the set of computers additionally programmed to:

k. upon creating the first data parcel, transmit instructions from the first account system to the brokerage accounts corresponding to the first account system to sell the stock, then transmit instructions from an administrative account system to brokerage accounts corresponding to the administrative account system to buy the stock;

l. upon creating the first circulation data set, transmit instructions from the first account system to the banking accounts corresponding to the first account system to send the currency to banking accounts corresponding to the administrative account system.

\* \* \* \* \*